United States Patent
Foster et al.

(10) Patent No.: US 6,675,956 B1
(45) Date of Patent: Jan. 13, 2004

(54) SLAT CONVEYOR WITH LIFTING SLATS AND CONVEYING SLATS

(76) Inventors: Raymond Keith Foster, P.O. Box 1, Madras, OR (US) 97741; Scott Delamarter, 853 Rodin Pl., 2000 Hamilton St., Philadelphia, PA (US) 19130

( * ) Notice: Subject to any disclaimer, the term of this patent is extended or adjusted under 35 U.S.C. 154(b) by 0 days.

(21) Appl. No.: 09/650,014

(22) Filed: Aug. 28, 2000

Related U.S. Application Data

(63) Continuation-in-part of application No. 08/544,962, filed on Oct. 18, 1995, now Pat. No. 6,439,375, and a continuation-in-part of application No. 08/327,630, filed on Oct. 24, 1994, now Pat. No. 5,588,522.

(51) Int. Cl.[7] .............................................. B65G 25/00
(52) U.S. Cl. ..................................... 198/775; 414/525.9
(58) Field of Search ........................... 198/621.4, 774.4, 198/775; 414/525.1, 525.9

(56) References Cited

U.S. PATENT DOCUMENTS

| | | | | |
|---|---|---|---|---|
| 2,335,601 A | * | 11/1943 | Mount ...................... | 198/774.4 |
| 3,086,642 A | * | 4/1963 | Schwarz ................... | 198/774.4 |
| 3,777,916 A | * | 12/1973 | Lutz ......................... | 198/774.4 |
| 3,815,726 A | * | 6/1974 | Klein ........................ | 198/774.4 |
| 4,044,886 A | * | 8/1977 | Sender ...................... | 198/774.4 |
| 4,116,619 A | * | 9/1978 | Beck ......................... | 198/774.4 |
| 5,588,522 A | * | 12/1996 | Foster et al. ............... | 198/775 |

* cited by examiner

*Primary Examiner*—Joseph E. Valenza
(74) *Attorney, Agent, or Firm*—Delbert J Barnard

(57) ABSTRACT

A slat conveyor includes both lifting slats (10) and conveying slats (12). Longitudinal movement of drive members (34) move lifting blocks (32) up lifting ramps (30). The tops of the lifting slats (10) rest on the lifting blocks (32) and the lifting slats (10) move upwardly with the lifting blocks (32). When the lifting slats (10) are in a "down" position, their upper surfaces are below the upper surfaces of the conveying slats (12). Advancing movement of the conveying slats (12) advance a load (L) that is on the conveying slats (12). At the end of a forward movement of the conveying slats (12), the lifting slats (10) are raised into an "up" position, lifting the load (L) above the upper surfaces of the conveying slats (12). Then, the conveying slats (12) are retracted while the load (L) is held by the lifting slats (10).

23 Claims, 22 Drawing Sheets

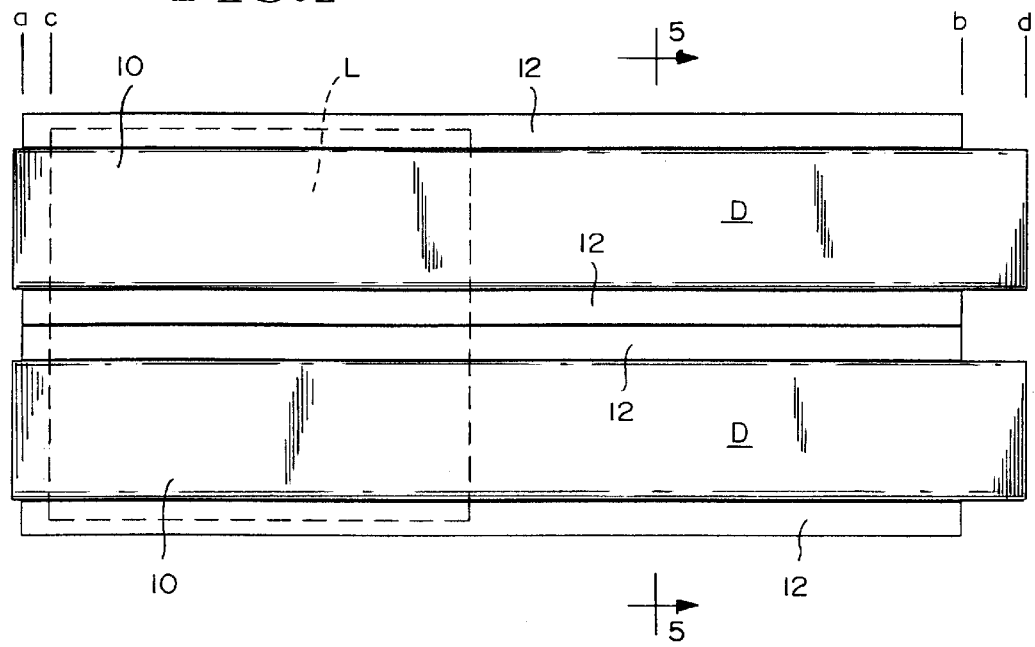
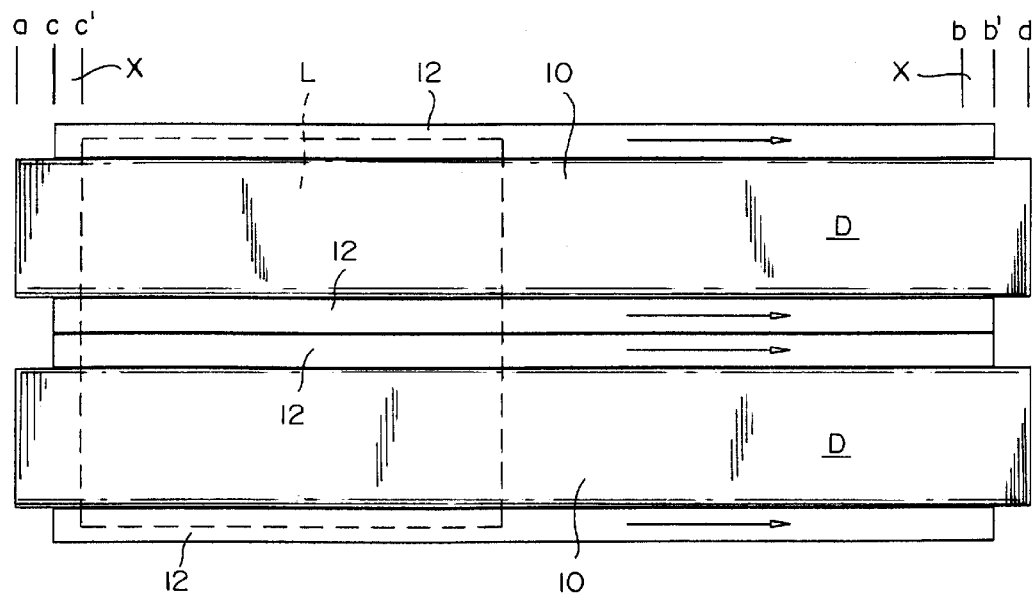

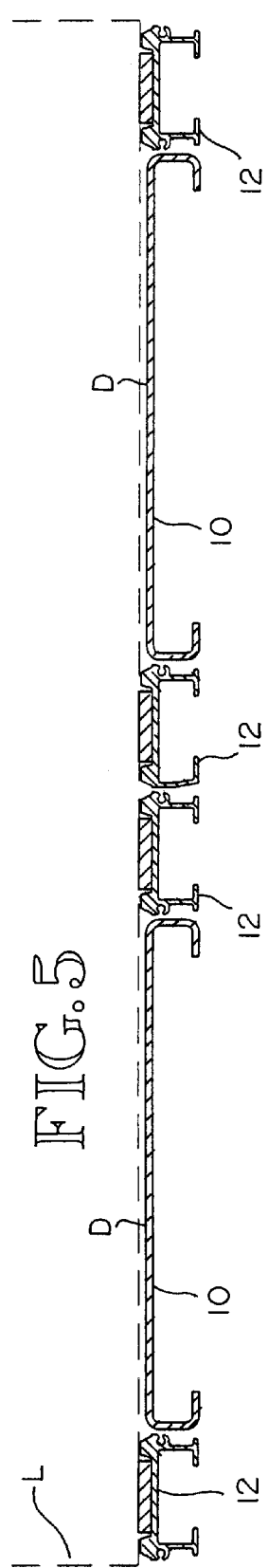
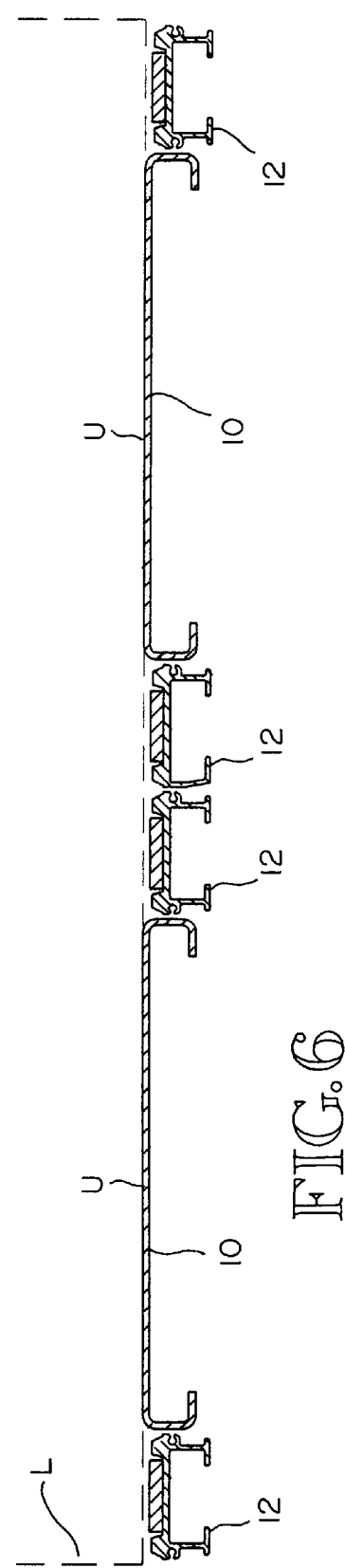

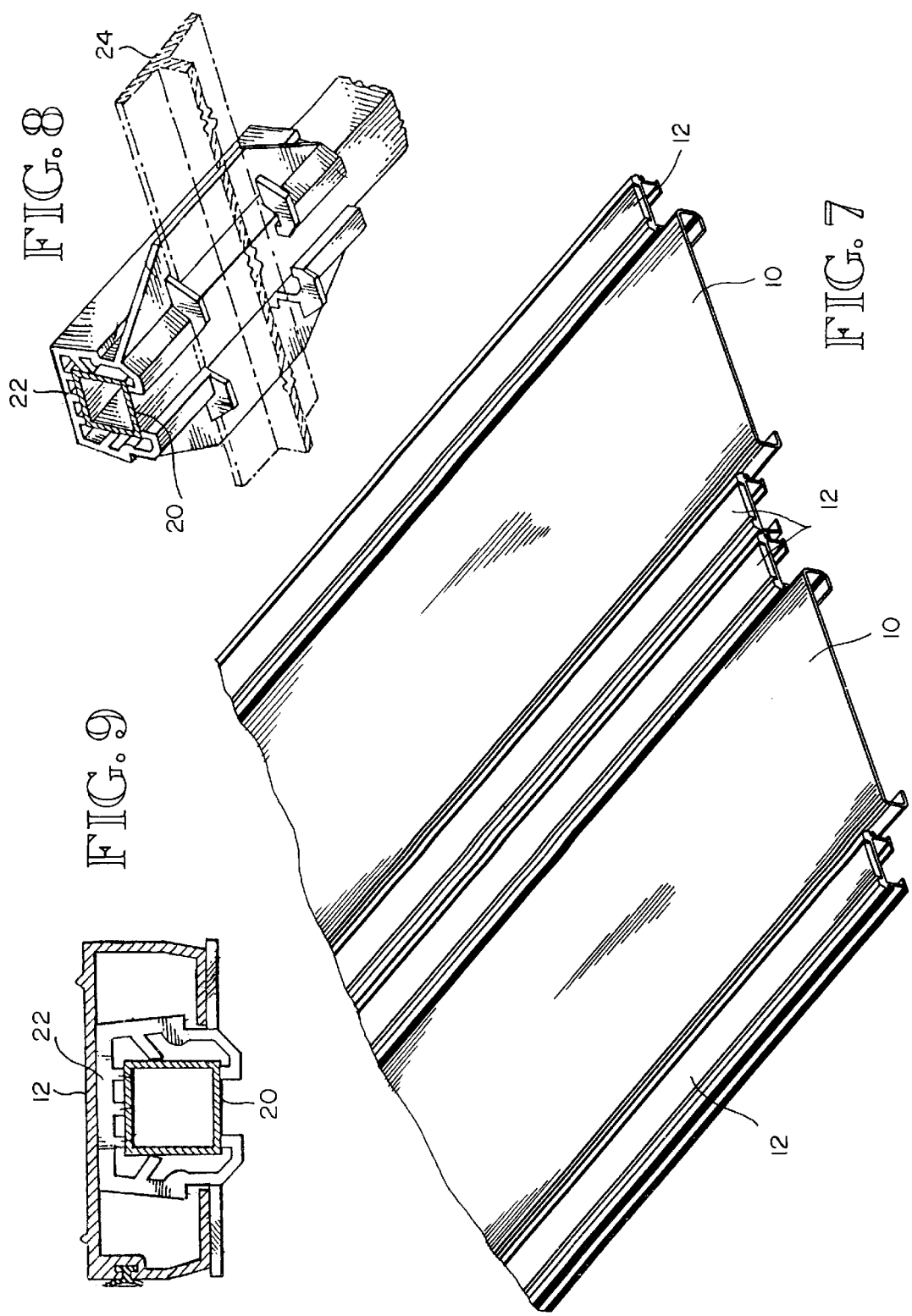

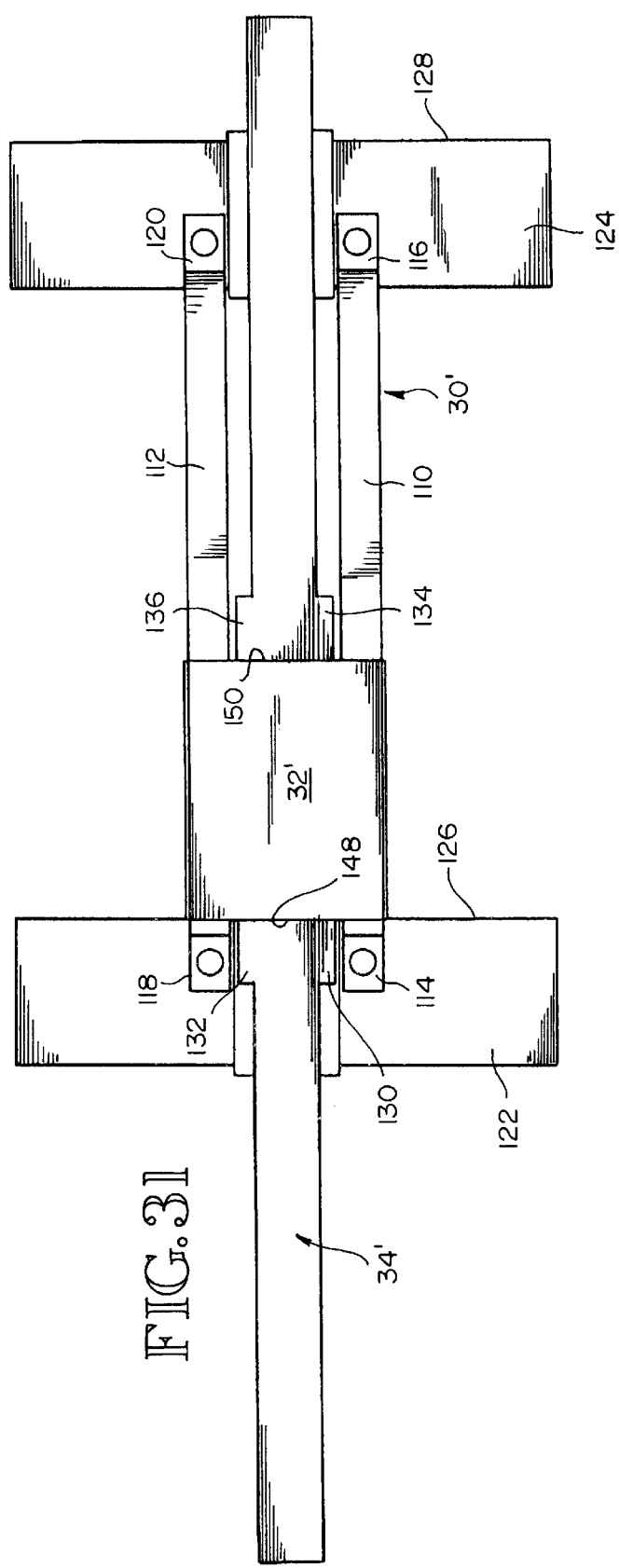
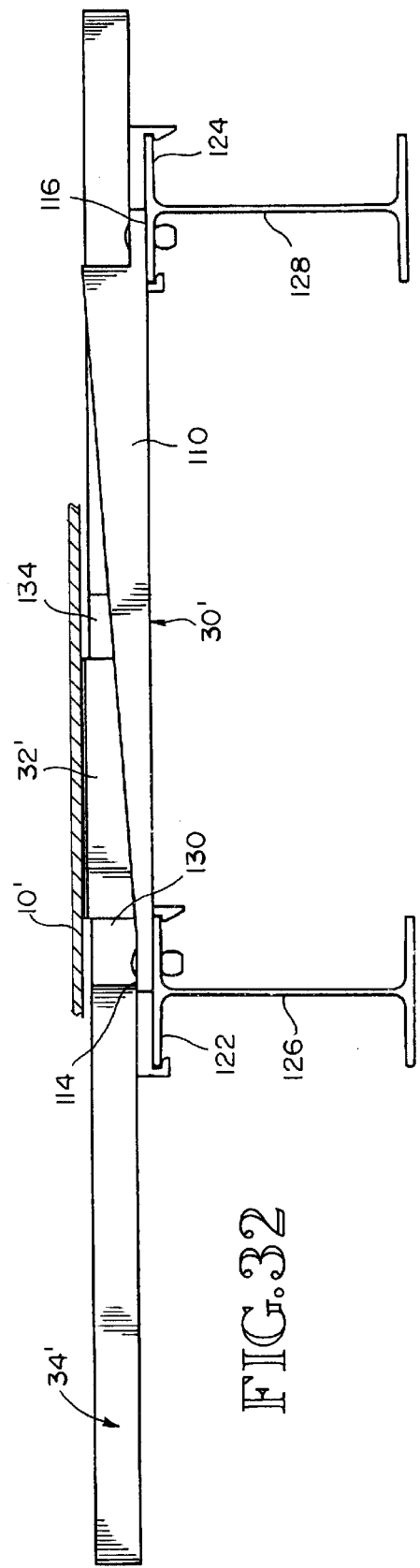

US 6,675,956 B1

SLAT CONVEYOR WITH LIFTING SLATS AND CONVEYING SLATS

RELATED APPLICATION

This application is a continuation-in-part of patent application entitled "Reciprocating Floor Conveyor For Conveying Palletized Loads Or The Like", Ser. No. 08/544,962, filed Oct. 18, 1995 now U.S. Pat. No. 6,439,379, as a continuation-in-part of an earlier application entitled, "Reciprocating Floor Conveyor For Conveying Palletized Loads Or The Like", Ser. No. 08/327,630, filed Oct. 24, 1994, now U.S. Pat. No. 5,588,522, granted Dec. 31, 1996.

TECHNICAL FIELD

This invention relates to reciprocating slat conveyors of the type having a plurality of movable slats for conveying a load and, more particularly, to a reciprocating slat conveyor having a first set of slats for conveying a load and a second set of slats for lifting and holding the load while the set of conveying slats retract.

BACKGROUND OF THE INVENTION

Reciprocating slat conveyors having a plurality of movable slats for conveying a load are now generally well known. They are used in a variety of applications and for conveying many different types of loads. Examples of reciprocating slat conveyors are disclosed by U.S. Pat. No. 2,973,856, granted Mar. 7, 1961, to Will E. Brooks; by U.S. Pat. No. 5,088,595, granted Feb. 18, 1992 to Olof A. Hallstrom; and by U.S. Pat. No. 4,793,469, granted Dec. 27, 1988 to Raymond K. Foster.

It has been discovered that reciprocating slat conveyors do not always function well when conveying palletized loads. With palletized loads, the pallets do not always remain balanced with their weight evenly distributed on the slats. The movable slats of a conveyor contact the bottom of the pallets at various contact points, about the pallets, rather than uniformly across the bottom surface of the pallets. Unfortunately, the contact points are not always evenly distributed across the conveyor slats. As a result, the advancing conveyor slats do not always advance the pallets in a uniform manner, and a retracting conveyor slat sometimes catch the pallets and rotates them. This can cause the load to become stuck or blocked on the conveyor. Consequently, reciprocating slat conveyors do not always convey palletized loads in a reliable and controlled manner.

With non-palletized loads, such as bulk loads and garbage, the distribution of the load remains relatively uniform across the conveyor slats and, thus, the conveyor slats can function to convey the load in a uniform, controlled manner. However, with palletized loads, especially with older, used pallets, which can become bent or warped, the pallets contact the movable slats at certain points non-uniformly distributed about the slats. As a result, the basic concept of reciprocating floor conveyors with movable slats-having more slats conveying the load than slats being retracted-does not always work to convey pallets and other similar type loads with fixed-form wide bases.

Accordingly, it is an object of the present invention to address the problems associated with conveying palletized loads or the like using reciprocating floor conveyors having a plurality of movable slats. Another object is to improve on the conveyor structures that are disclosed in the aforementioned U.S. Pat. No. 5,588,522 and the aforementioned pending application Ser. No. 08/544,962.

BRIEF SUMMARY OF THE INVENTION

The present invention includes providing at least one lifting slat having a down position, an up position and a top. A fixed position lifting ramp is provided below the top of the lifting slat. The lifting ramp has an upper surface that slopes upwardly from a low end to a high end. A lifting block is positioned on the lifting ramp, vertically between the lifting ramp and the top of the lifting slat. The lifting block has a sloping bottom surface. corresponding in slope to the top surface of the lifting ramp. The lifting block has a top surface that is substantially parallel to the top of the lifting slat when the sloping bottom surface of the lifting block in on the sloping top surface of the lifting ramp. A longitudinally reciprocating drive member is provided. It includes at least one abutment that is movable against the lifting block as the drive member moves in a first direction, for forcing the lifting block up the lifting ramp, so as to cause the lifting block to push upwardly on the lifting slat and move it upwardly into its up position. The drive member also includes at least one other abutment that when the drive member is reversed is movable against the lifting block for forcing the lifting block down the lifting ramp, allowing the lifting slat to drop downwardly into its down position.

According to another aspect of the invention, the lifting block further includes a pair of sidewalls which depend downwardly from the bottom surface outwardly adjacent the opposite sides of the lifting ramp.

In one embodiment of the invention, the drive frame has a pair of longitudinally extending side members that are positioned outwardly of both the lifting ramp and the lifting block and interconnecting transverse members. Each side member includes a pair of inwardly projecting abutments defining between them a space in which a side portion of the lifting block is received. The lifting block may have a pair of opposite side portions which depend from the sloping lower surface of the block into positions that are laterally outwardly from side boundaries of the lifting ramp, laterally inwardly from the longitudinal portions of the drive frame, and longitudinally between the two abutments that project inwardly from the side members of the drive frame.

The lifting ramp may be constructed from metal and the lifting block may be constructed from a self-lubricated plastic material such that the lifting block acts as a bearing both where it contacts the ramp and where it is contacted by the lifting slat.

According to another aspect of the invention, the conveyor includes a base frame below the drive frame and the lifting ramp. The lifting ramp is secured to the base frame. A self-lubricated plastic bearing is positioned vertically between the drive frame and the base frame for facilitating sliding movement of the drive frame relative to the base frame.

In a second embodiment, the lifting ramp may include two laterally spaced apart side parts, each having an upper surface that slopes upwardly from a low end to a high end. A lifting block is positioned on the lifting ramp side parts, vertically between the lifting ramp side parts and the top of the lifting slat. The lifting block has a sloping bottom surface on each of its sides corresponding in slope to the upper surfaces of the lifting ramp side parts. It also has a top surface that is substantially parallel to the top of the lifting slat when the sloping bottom surfaces of the lifting block are on the sloping top surfaces of the lifting ramp side parts. In this embodiment, a longitudinally reciprocating drive member is provided. It includes at least one abutment that is movable against the lifting block as the drive member moves in a first direction, for forcing the lifting block up the lifting ramp, so as to cause the lifting block to push upwardly on the lifting slat and move it upwardly into its up position. The drive member also includes at least one other abutment that when the drive member is reversed is movable against the lifting block for forcing the lifting block down the lifting ramp, allowing the lifting slat to drop downwardly into its down position.

In the second embodiment, the lifting block may comprise a top portion that includes the sloping bottom surfaces and the top surface. It may further include a pair of vertical walls that depend downwardly from the top portion on opposite sides of the drive member and inwardly adjacent the side parts of the lifting ramp. In this embodiment, the drive member may be a longitudinal member that is positioned between the side parts of the lifting ramp. It may be provided with a pair of outwardly projecting abutments forwardly of the lifting block and another pair of outwardly projecting abutments rearwardly of the lifting block. The abutments move in a space that is laterally between the side parts of the lifting ramp. As in the earlier embodiment, the lifting ramp may be constructed from metal and the lifting block may be constructed from a self-lubricated plastic material such that the lifting block acts as a bearing.

The invention also includes a conveyor construction composed of a plurality of lifting slats and a plurality of conveying slats. The conveying slats are mounted and driven to reciprocate back and forth in a common plane. The lifting slats are movable up and down relative to this plane. When the lifting slats are in their "down" position, their top surfaces are below the top surfaces of the conveying slats. A load on the conveyor will be supported solely on the conveying slats. Movement of the conveying slats in a conveying direction will move the load with them in the conveying direction. When the lifting slats are in their "up" position, they lift the load up off of the conveying slats. This allows the conveying slats to be retracted to a start position while the load is supported above them by the lifting slats.

Other objects, advantages and features of the invention will become apparent from the description of the best mode set forth below, from the drawings, from the claims and from the principles that are embodied in the specific structures that are illustrated and described.

BRIEF DESCRIPTION OF THE SEVERAL VIEWS OF THE DRAWING

In the drawings, like element designations refer to like part throughout the several views, and FIG. 1 is a top plan diagram of a slat conveyor that includes conveying slats and lifting slats, such diagram showing the lifting slats in a down position and the conveying slats in a start position, ready for conveying to the right;

FIG. 2 is a view like FIG. 1, but showing the conveying slats moving in unison to convey the load to the right, as indicated by arrows;

FIG. 5 is a cross sectional view taken substantially along line 5—5 of FIG. 1, showing substantially true cross sectional shapes of the two types of slats, but minus the supporting structure, and showing the lifting slats in a down position, and including the broken line showing of a load on the conveyor;

FIG. 6 is a view like FIG. 5, but showing the lifting slats raised into their up position;

FIG. 7 is a fragmentary pictorial view taken from above and looking towards one end and one side of the conveyor shown by FIGS. 1–6;

FIG. 8 is a fragmentary pictorial view taken from below and looking upwardly towards the bottom, one end and one side of a bearing and a length section of a guide beam on which the bearing is mounted;

FIG. 9 is a cross sectional view taken through a conveying slat and a guide beam on which it is mounted, such view presenting an end view of a bearing that is positioned on the guide beam, vertically between it and the conveying slat;

FIG. 31 is a view like FIG. 20, but of the second embodiment;

FIG. 32 is a view like FIG. 22, but of the second embodiment;

DETAILED DESCRIPTION OF THE INVENTION

FIGS. 1–25 illustrate a first embodiment of the invention and FIGS. 27–35 illustrate a second embodiment of the invention. FIG. 26 illustrates a drive/control system that is usable with either embodiment. FIGS. 1–4 are sequence of operation views. Although these views are directed to the first embodiment, they also show the sequence of operation of the second embodiment.

Referring to FIGS. 1–25, the first embodiment comprises wide lifting slats 10 and narrow conveying slats 12. The lifting slats 10 move up and down but do not move lengthwise. The conveying slats 12 move lengthwise but do not move up and down. The moving slats 12 reciprocate back and forth between a starting position a and an advanced position b" (FIG. 2). As will be hereinafter described in some detail, the conveying slats 12 are all connected to a common cross member 14 (FIG. 25). The cross member 14 is connected to moving portion of one or more longitudinally extending hydraulic drive units that reciprocate the cross member 14 forwardly and rearwardly. As it moves, the cross member 14 moves the conveying slats 12 with it.

Figure 3:
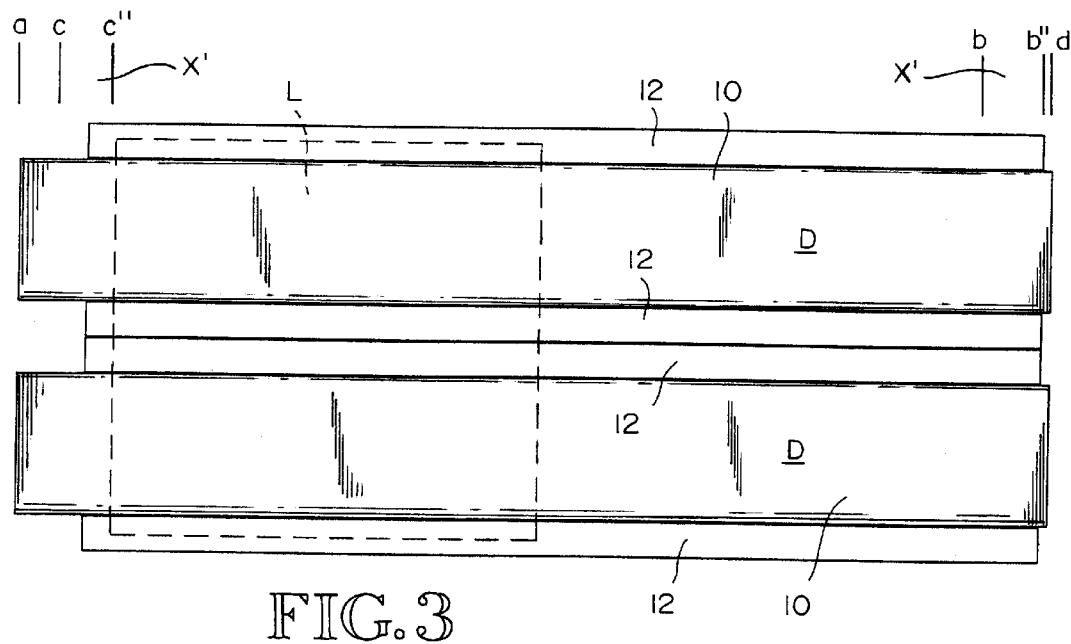
FIG. 3 is a view like FIGS. 1 and 2 but showing the conveying slats stopped at an advanced position.
Figure 4:
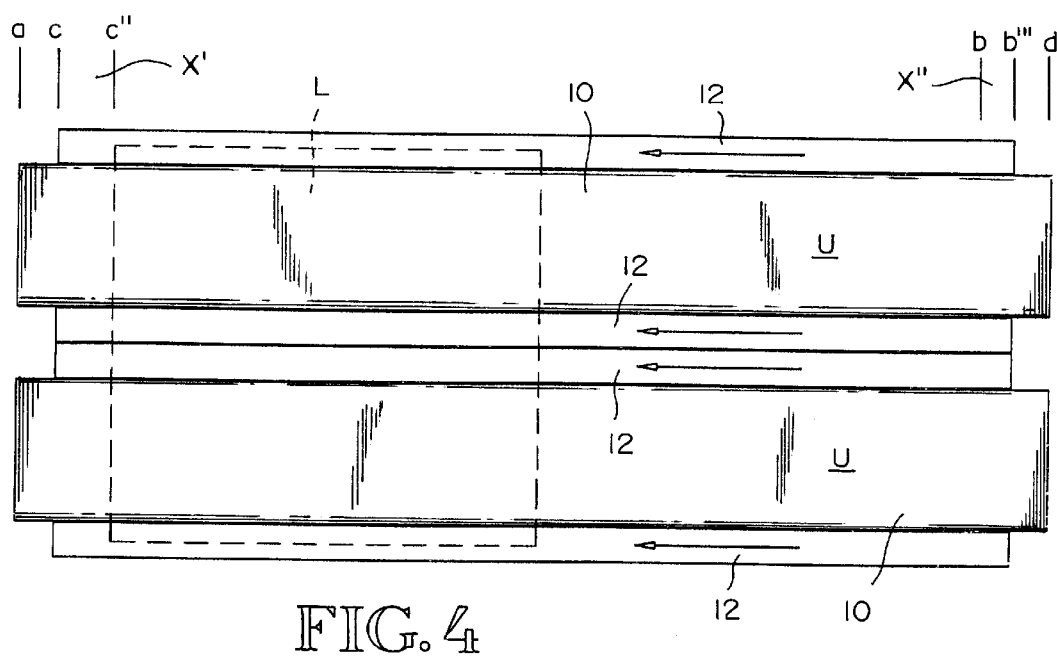
FIG. 4 is a view like FIGS. 1–3, showing the lifting slats in an up position and the conveying slats returning to the left, towards the start position and the start of a new cycle.

Referring to FIG. 1, the conveying slats 12 are at a start position, marked by i at the rear ends of the slats 12 and b at the forward ends of the slats 12. A load L is shown by broken lines in FIGS. 1–4. In FIG. 1, the load L is at a start position on the conveyor. Its rear edge is at position c. In FIGS. 1–3, the lifting slats 10 are marked with "D", meaning that in those views they are in a "down" position. In FIG. 4, the lifting slats 10 are marked "U", meaning that in this view they are in an "up" position. FIGS. 5 and 6, end views of the conveyor, include the same "D" and "U" designations. In FIG. 5, the load L is resting on the conveying slats 12 and the lifting slats 10 are in their "down" position with their upper surfaces spaced below the bottom of the load L. In FIG. 6, the lifting slats 10 are in their "up" or raised positions in which they contact the load L and raise it up off of the conveying slats 12.

FIG. 2 shows the conveying slats 12 having moved a distance x. FIG. 3 shows the conveying slats 12 stopped at the advanced position b". The load L has moved a total distance x'. FIG. 4 shows the lifting slats 10 and the load L raised and the conveying slats 12 in the process of returning back to the start position. As clearly shown by FIGS. 5 and 6, when the lifting slats 10 are "down", forward movement of the conveying slats 12 will move the load L. This is because the load L is resting on the tops of the conveying slats 12 and are out of contact with the tops of the lifting slats 10. When the lifting slats 10 are raised (FIG. 6), they raise with them the load L. The load L is lifted up off of the conveying slats 12 and is held in position by the lifting slats 10. This enables the conveying slats 12 to be retracted by themselves without in any way influencing the position of the load L.

As shown by FIGS. 1–7, a typical conveyor may comprise two lifting slats 10 and four conveying slats 12. In the first embodiment, there are two conveying slats 12 between the two lifting slats 10 and a conveying slat 12 outwardly of each lifting slat 10. As shown by FIGS. 5 and 6, this arrangement provides a balanced support for the load L, both when it is being conveyed by the conveying slats 12 and when it is being held by the lifting slats 10. However, the number and arrangement of the lifting slats 10 and the conveying slats 12 are variables and the arrangement can vary considerably. For some loads, the conveyor need have only a single lifting slat flanked by a pair of conveying slats 12. Also, the width of the conveying and/or lifting slats can vary. In the embodiment shown by FIGS. 1–25, the two center conveying slats 12 can be replaced by a single preferably wider conveying slat.

The conveying slats 12 can be supported for movement by tubular metal guide beams 20 and plastic bearings 22, such as shown by FIGS. 8 and 9 herein and fully disclosed in U.S. Pat. No. 4,785,929, granted Nov. 22, 1988, to Raymond K. Foster (incorporated herein by this reference). The guide beams 20 extend longitudinally of a support frame (FIGS. 24 and 25) and are secured to cross members 24 which may be channel members or I-beams. The bearings 22 are made to snap fit down onto the guide beams 20 where the guide beams intersect a cross, beam 24 (FIG. 8). Preferably, the conveying slats 12 are adapted to snap fit onto the bearings 22. Of course, in a given installation, bearings may be used that do not permit a snap fit. In that case, the conveying slats 12 are moved endwise onto the bearings.

Figure 22:
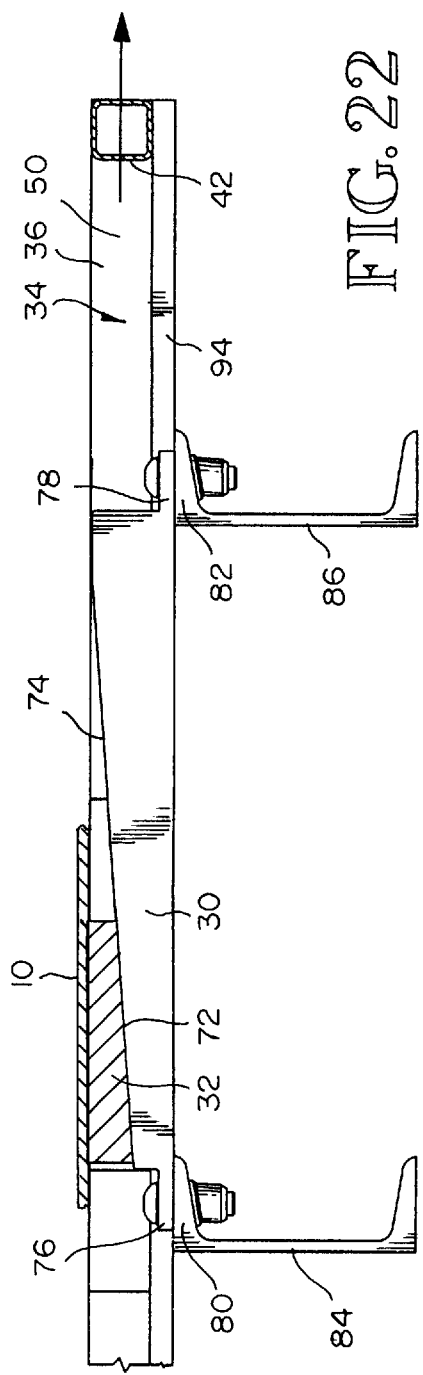
FIG. 22 is a sectional view taken substantially along line 22—22 of FIG. 20.
Figure 23:
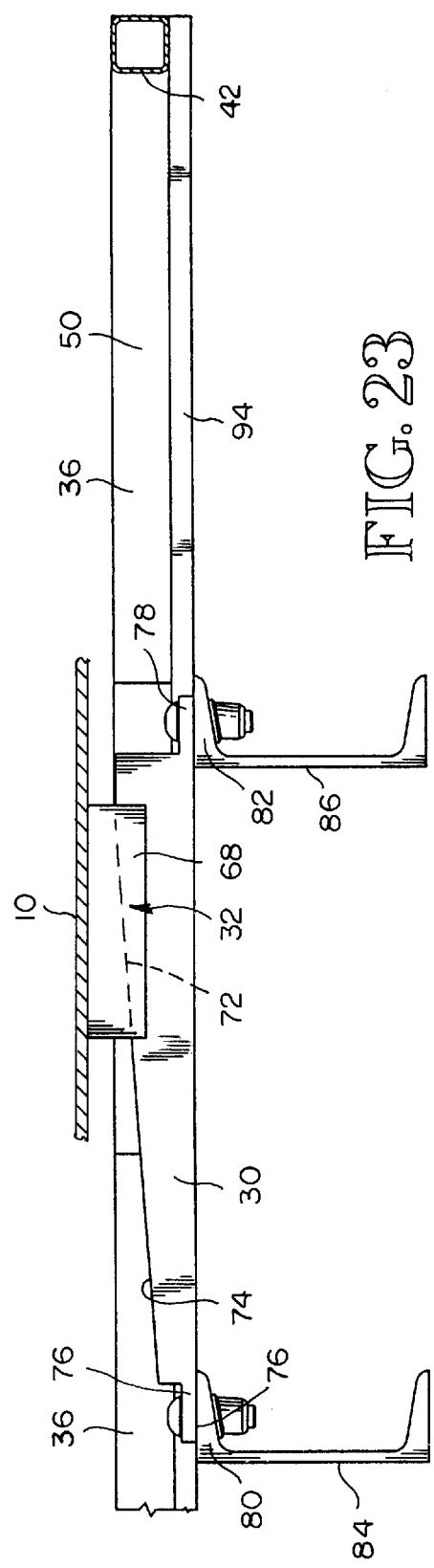
FIG. 23 is a sectional view taken substantially along line 23—23 of FIG. 20.

The embodiment of FIGS. 1–25 is characterized by lifting ramps 30, lifting blocks 32 and drive members 34 which reciprocate and in the process move the drive blocks 32 up and down the lifting ramps 30. There is a drive member 34 for each lifting slat 10. FIGS. 22 and 23 include a top wall fragment of a lifting slat 10 contacting the top surface of a lifting member 32. In FIG. 22, the lifting block 32 is at the lower end of its lifting ramp 30. There are a plurality of the lifting ramps 30 and lifting blocks 32 spaced apart under each lifting slat 10. Movement of the drive member 34 to the right results in each of the lifting blocks 32 being forced up its lifting ramp 30. The sloping bottom of the lifting block 32 slides on the sloping top of the lifting ramp 30 and the flat top of the lifting block 32 slides along the bottom surface of the top panel of the lifting slat 10. When the lifting block 32 is in the position shown by FIG. 23, i.e. when it is at the high end of the lifting ramp, the lifting slat 10 is raised into the position shown by FIG. 23. The lifting slat 10 does not move in the longitudinal direction. It merely raises straight up under the influence of the wedge shaped lifting blocks 32 sliding up the lifting ramps 30.

Figure 10:
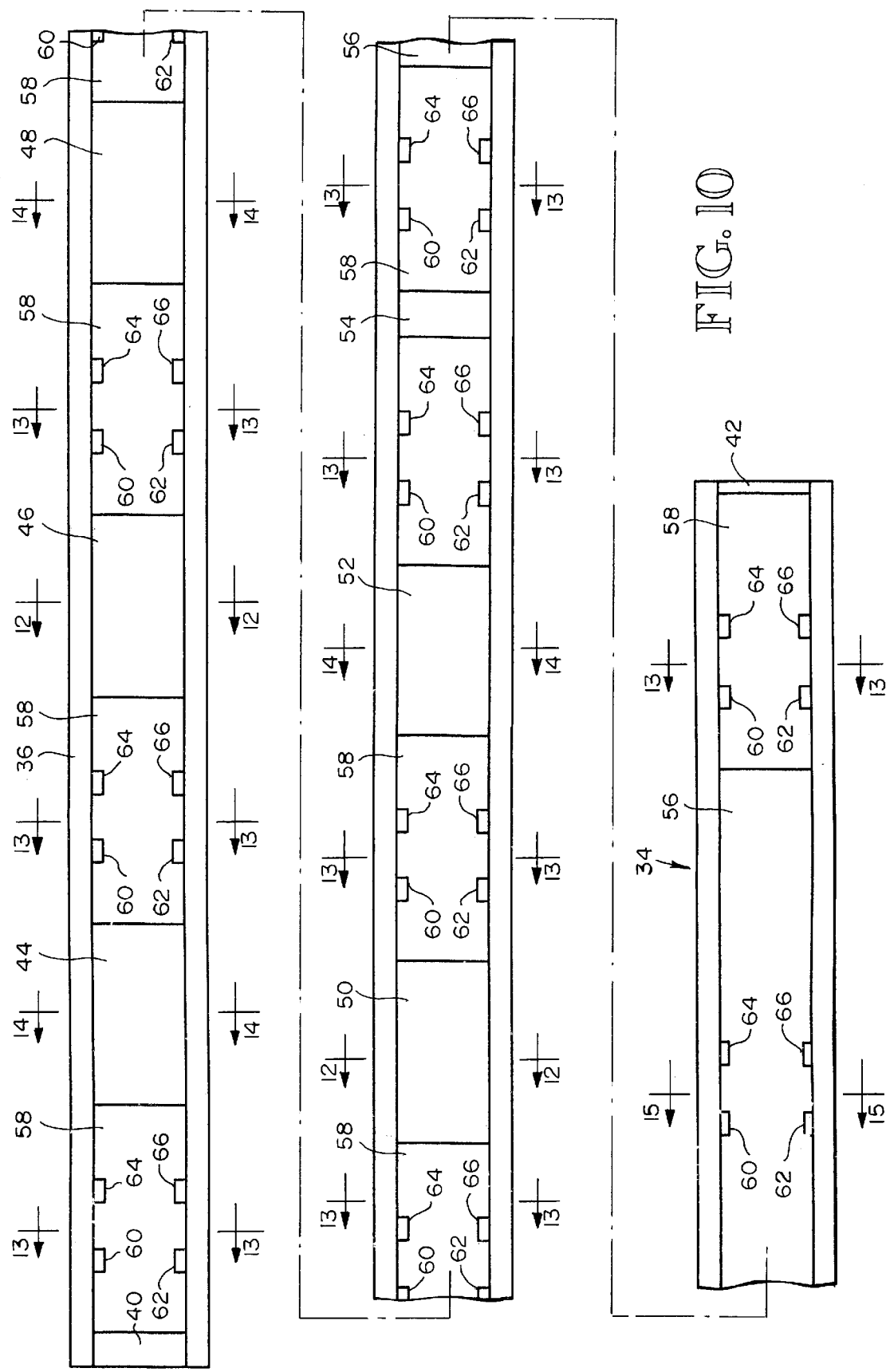
FIG. 10 is a sectional plan view of a longitudinal drive frame, such view showing the drive frame in three length sections.
Figure 11:
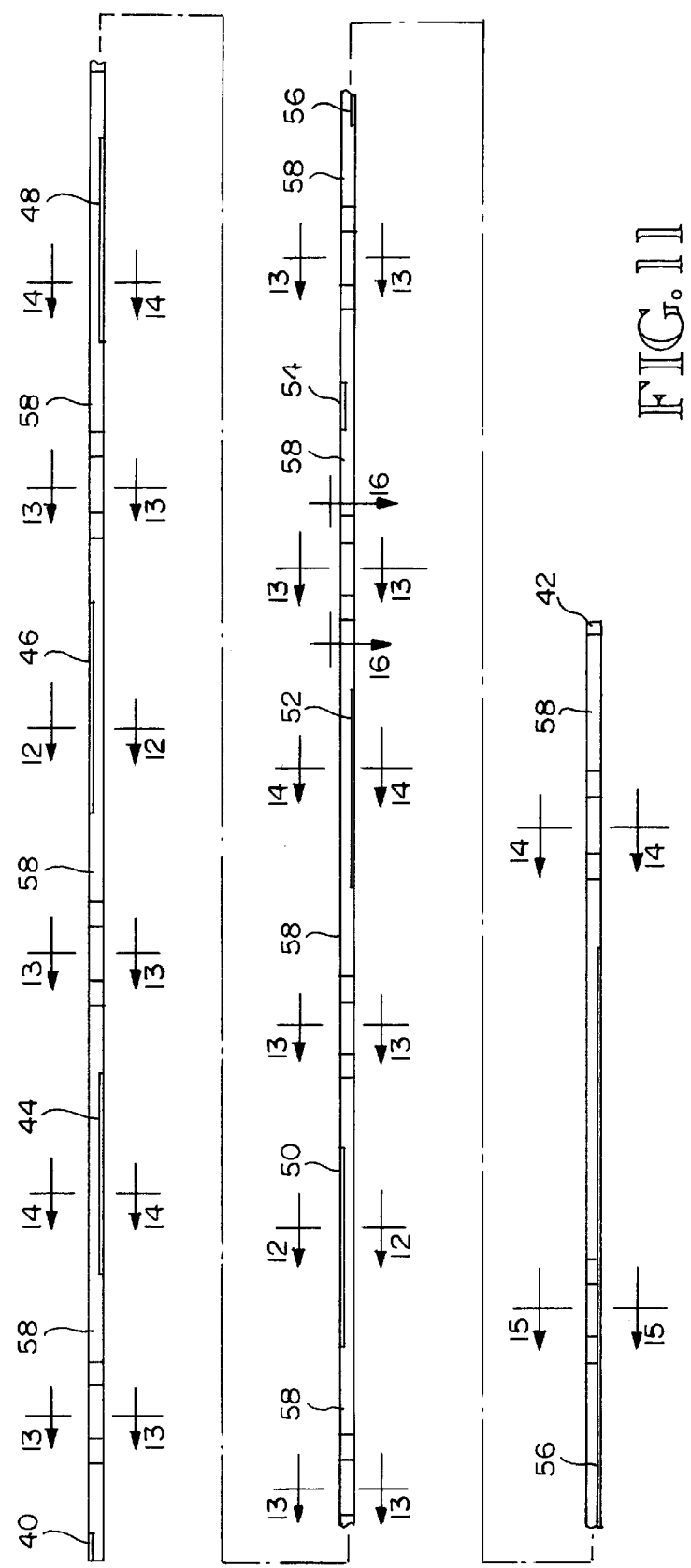
FIG. 11 is a sectional side elevational view of the drive frame shown by FIG. 10, also in three length sections.
Figure 12:
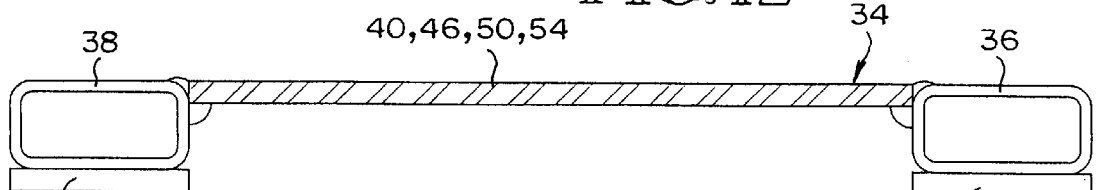
FIG. 12 is a cross sectional view taken substantially along lines 12—12 in FIGS. 10 and 11.
Figure 13:
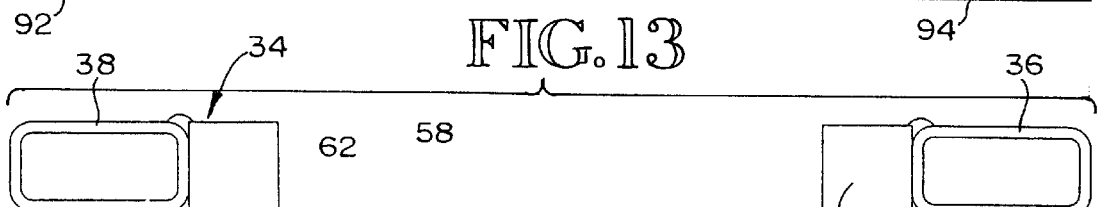
FIG. 13 is a cross sectional view taken substantially along lines 13—13 in FIGS. 10 and 11.
Figure 14:
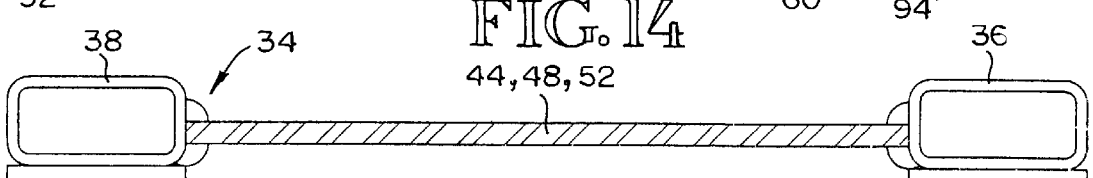
FIG. 14 is a cross sectional view taken substantially along lines 14—14 in FIGS. 10 and 11.
Figure 15:
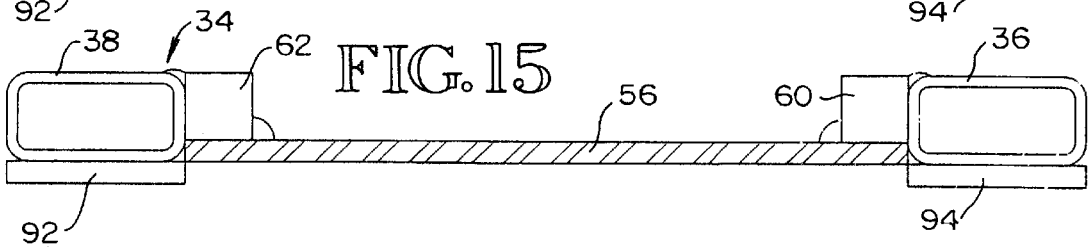
FIG. 15 is a cross sectional view taken substantially along lines 15—15 in FIGS. 10 and 11.
Figure 16:
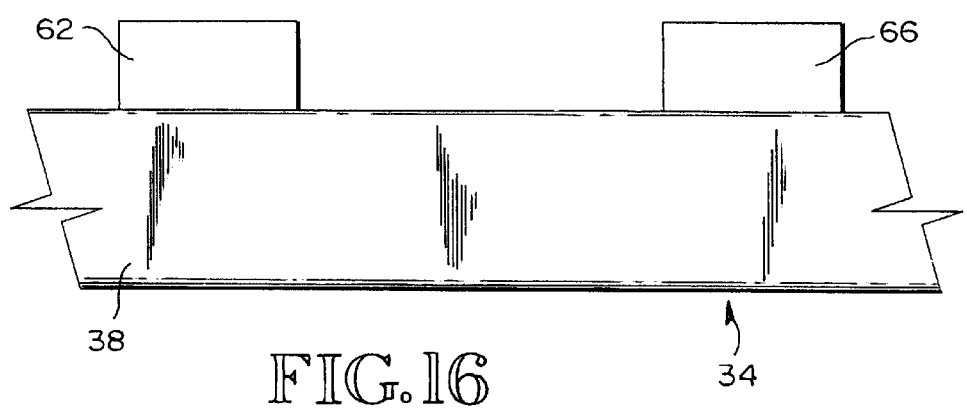
FIG. 16 is a fragmentary plan view taken substantially along lines 16—16 in FIG. 11.

Referring to FIGS. 10 and 11, the drive member 34 is shown to comprise a pair of side members 36, 38, a pair of end members 40, 42 and a plurality of plates 44, 46, 48, 50, 52, 54, 56. Plates 44, 48, 52 are positioned slightly below the vertical centers of the side members 36, 38. Plates 46, 50, 54 are substantially flush with the top of the side members 36, 38, as shown in FIG. 12. Plate 56 is substantially flush with the bottom surfaces of the side members 36, 38, as shown in FIG. 15. The side edges of the plates 44, 46, 48, 50, 52, 54, 56 are welded to the side members 36, 38. In the open regions 58, the drive members 34 are provided with opposed pairs of abutments 60, 62, 64, 66. Abutments 60, 62 confront each other across the member 34. In similar fashion, abutments 64, 66 confront each other across the member 34. Abutments 64, 66 are longitudinally spaced from the abutments 60, 62. As clearly shown by FIG. 17, each lifting block 32 has opposite side portions 68, 70. These side portions 68, 70 project downwardly below the sloping undersurface 72 of the lifting block 32. Side portion 68 is positioned laterally between the lifting ramp 30 and side member 38. Side portion 70 is positioned laterally between lifting ramp 30 and side member 36. Side portion 68 is positioned longitudinally between the two abutments 62, 66. Side portion 70 is positioned longitudinally between abutments 60, 64. As clearly established by FIGS. 17–21, movement of the drive member 34 to the right as illustrated will move the abutments 60, 62 against the end surface 76 of the lifting block 32. This will cause the lifting block 32 to be pushed or forced up the sloping top surface 74 of the lifting ramp 30. Movement of the drive member 34 in the opposite direction will move the abutments 64, 66 against the end surface 78 of the lifting block 32. This will cause the lifting block 32 to move downwardly on the lifting ramp 30, allowing the lifting slat 10 to gravitate from its "up" position to its "down" position.

Figure 17:
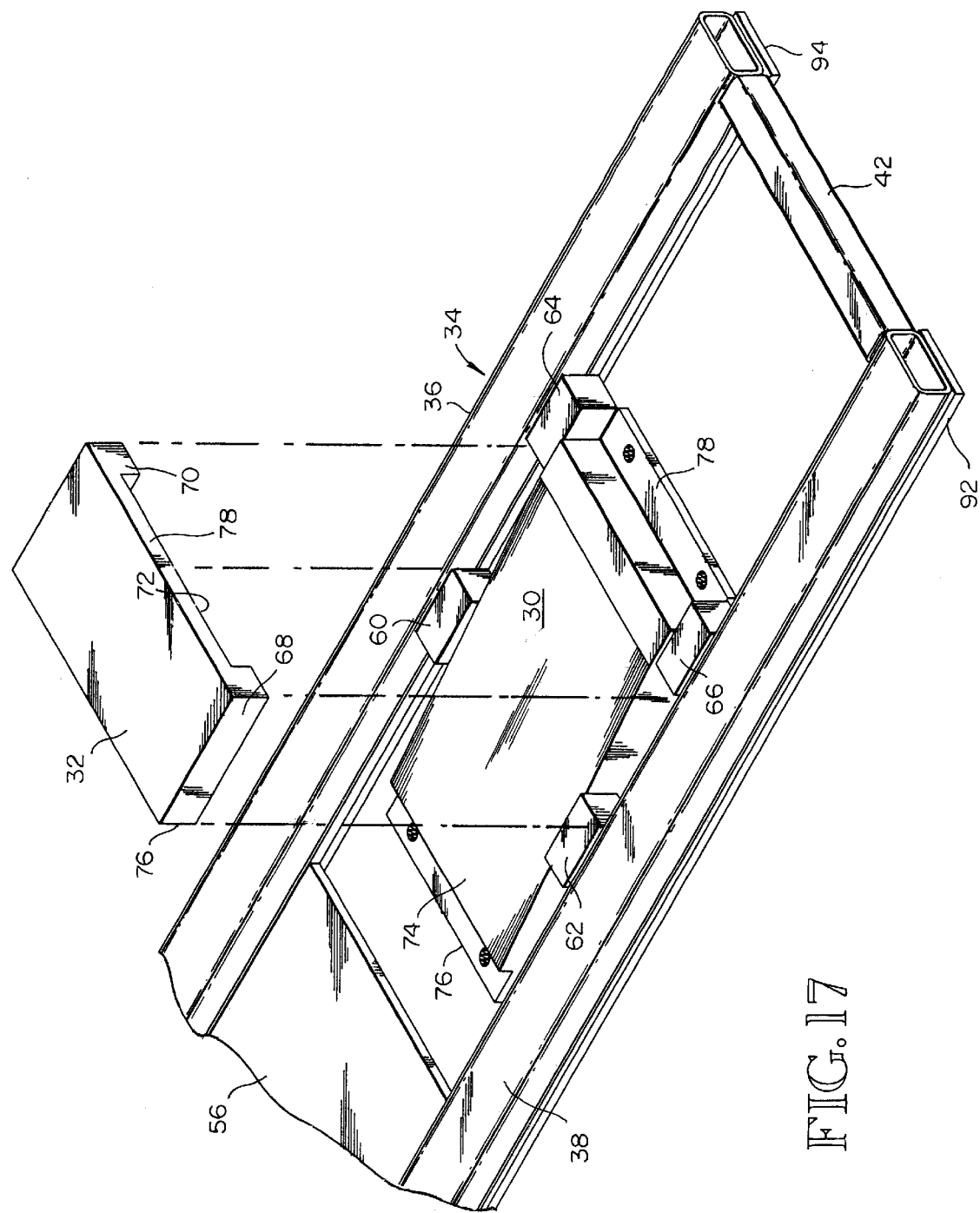
FIG. 17 is a fragmentary pictorial view of the drive frame shown by FIGS. 10 and 11, taken in the vicinity of a lifting ramp and a lifting block, such view showing the lifting block spaced upwardly from the lifting ramp.
Figure 18:
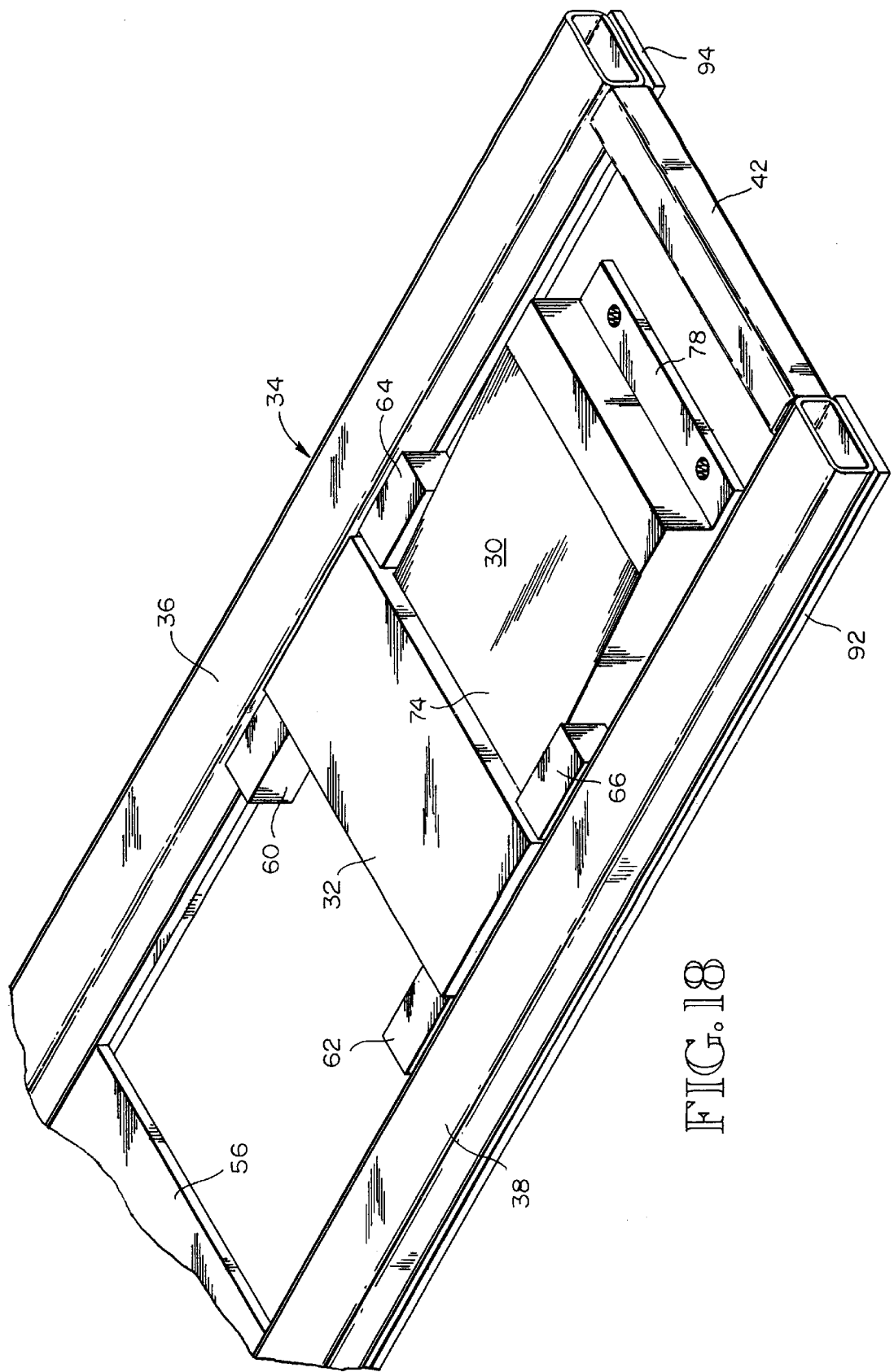
FIG. 18 is a view like FIG. 17, but showing the lifting block down on the lifting ramp, at the lower end of the lifting ramp.
Figure 19:
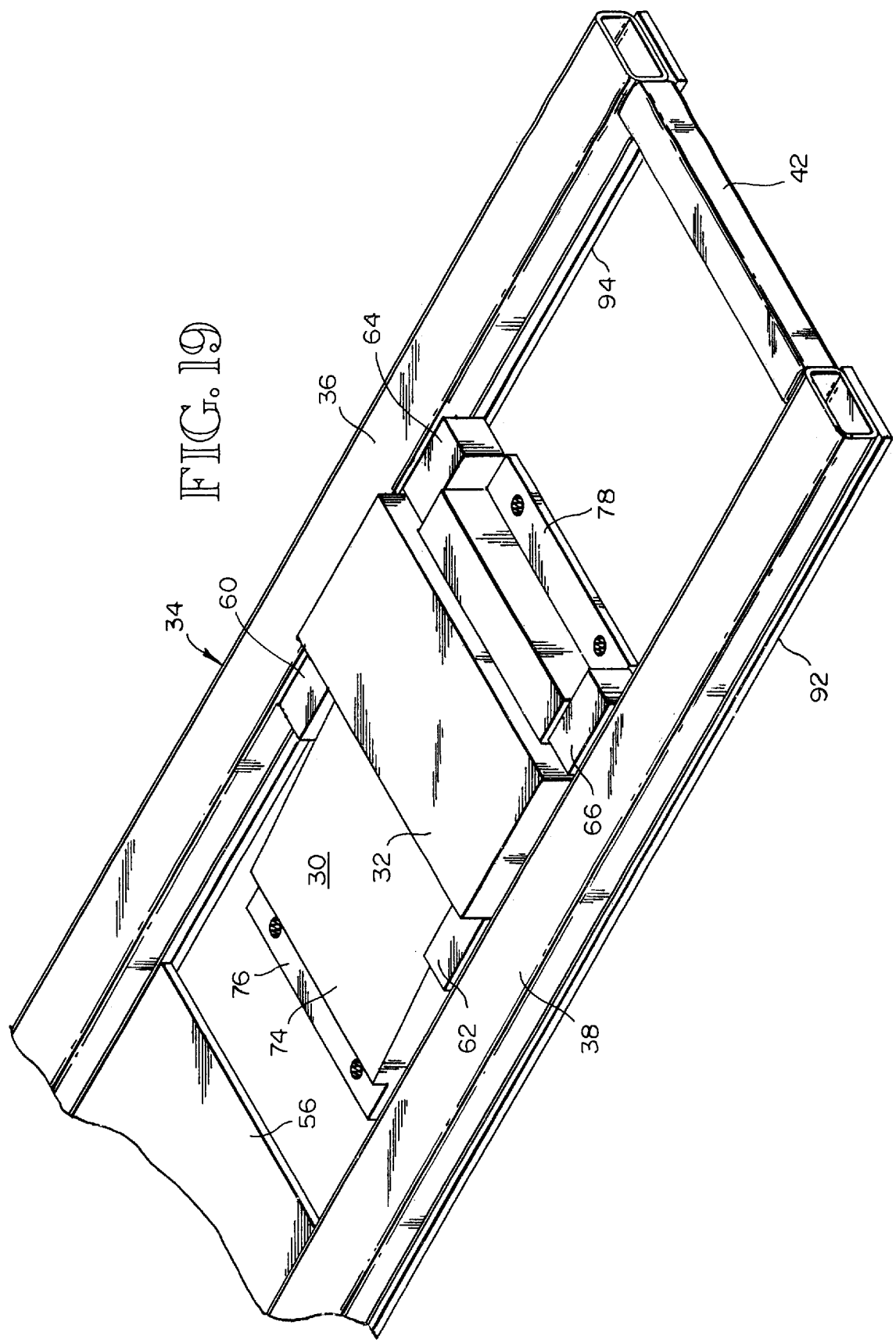
FIG. 19 is a view like FIG. 18, but showing the drive frame moved towards the right from the position shown in FIG. 18, for pushing the lifting block up the lifting ramp.
Figure 20:
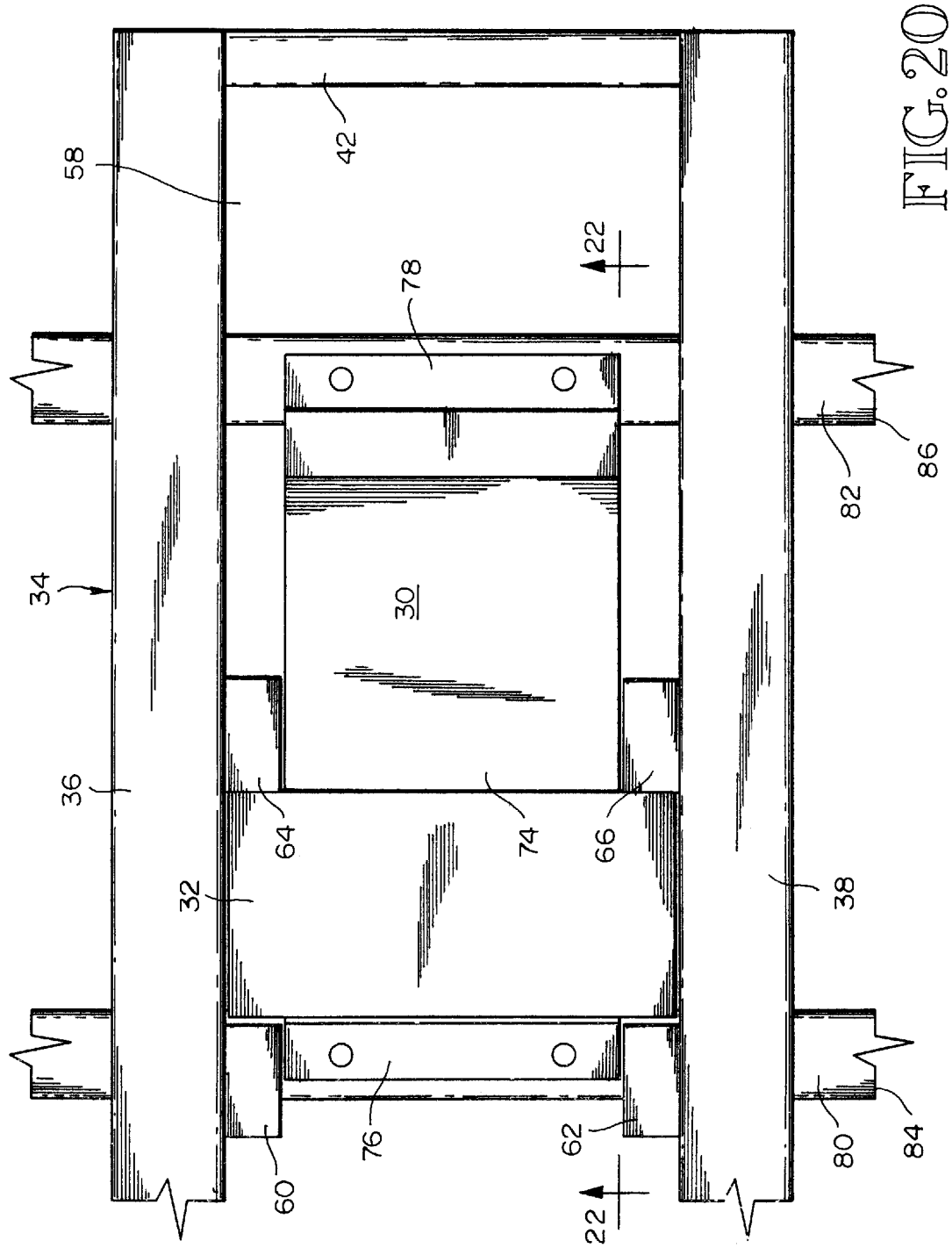
FIG. 20 is a top plan view of the region shown by FIGS. 17–19, showing the drive frame positioned to place the lifting block at the lower end of the lifting ramp.
Figure 21:
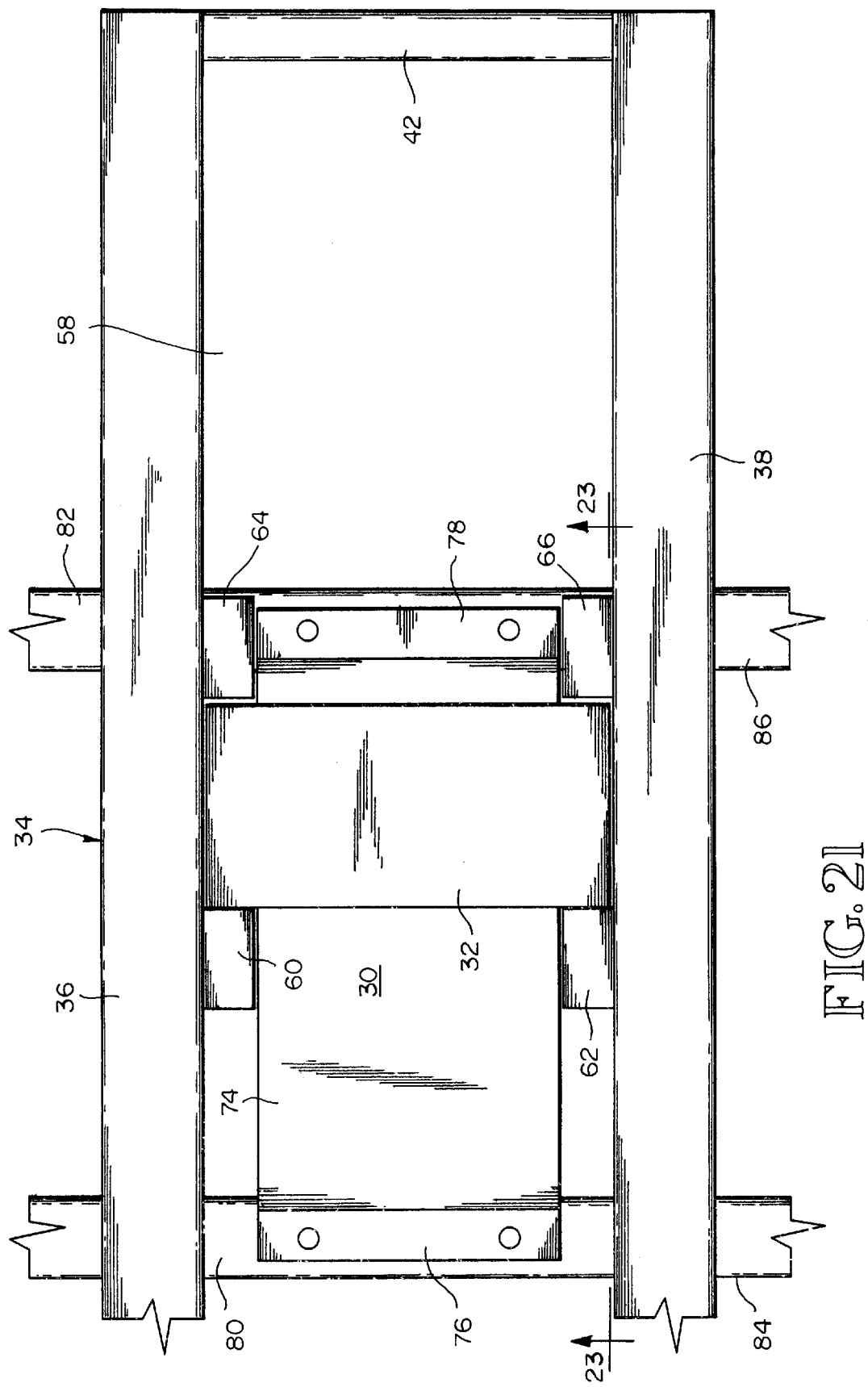
FIG. 21 is a view like FIG. 20, but showing the drive frame repositioned to move the lifting block upwardly onto the upper end of the lifting ramp.

FIG. 17 shows the lifting block 32 raised above its position laterally between the side members 36, 38 and the lifting ramp 30 and longitudinally between the abutment pairs 60, 62 and 64, 66. FIG. 18 shows the lifting ramp 32 lowered into such position, with the drive member 34 retracted to place the lifting block 32 at the low end of the lifting ramp 30. FIG. 19 shows the drive member 34 moved to the right, resulting in the abutments 60, 62 pushing the lifting block 32 up the sloping surface 74 of the lifting ramp 30. The rise of the surface 74 acting on the surface 72 raises the lifting block 32 in position and it in turn lifts up on the top panel of the lifting slat 10 (FIG. 23).

Referring to FIGS. 22 and 23, the lifting ramps 30 have flanges 76, 80 at their ends. These flanges 76, 78 are bolted or otherwise connected to top portions 80, 82 of transverse frame members 84, 86. The base frame of the conveyor includes longitudinal side members 88, 90 and a plurality of transverse members, two of which are members 84, 86. The transverse members 84, 86 may be channel members, I-beam members, wide flange members, tubular members, etc. It is necessary that they have top portions to which the ends of the lifting ramps 30 can be secured. It is also necessary that they have substantially flat upper surfaces along which bearing members 92, 94 can slide. The bearing members 92, 94 are made from a self-lubricated plastic. Bearing members 92, 94 are strips that extend lengthwise of the side members 36, 38 or at least those portions of side members 36, 38 that extend over the tops of the cross members 84, 86, etc.

Figure 24:
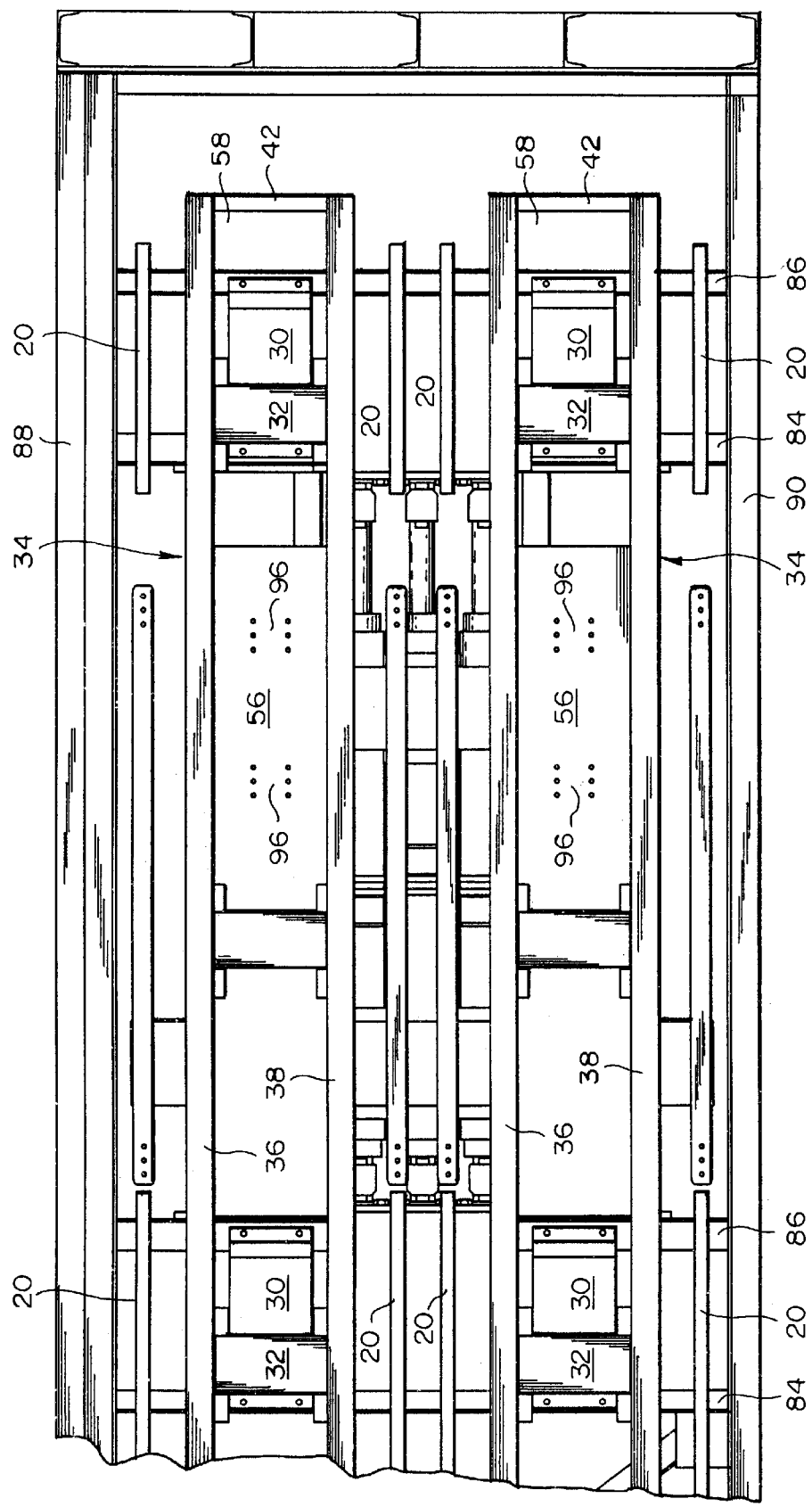
FIG. 24 is a top plan view of an end portion of a conveyor where a drive assembly is located, such view showing portions of the drive element, for the conveying slat and portions of the drive frames that move the lifting blocks up and down the lifting ramps, such view showing the conveying slats and the lifting slats removed so as to expose the components that are below them.
Figure 25:
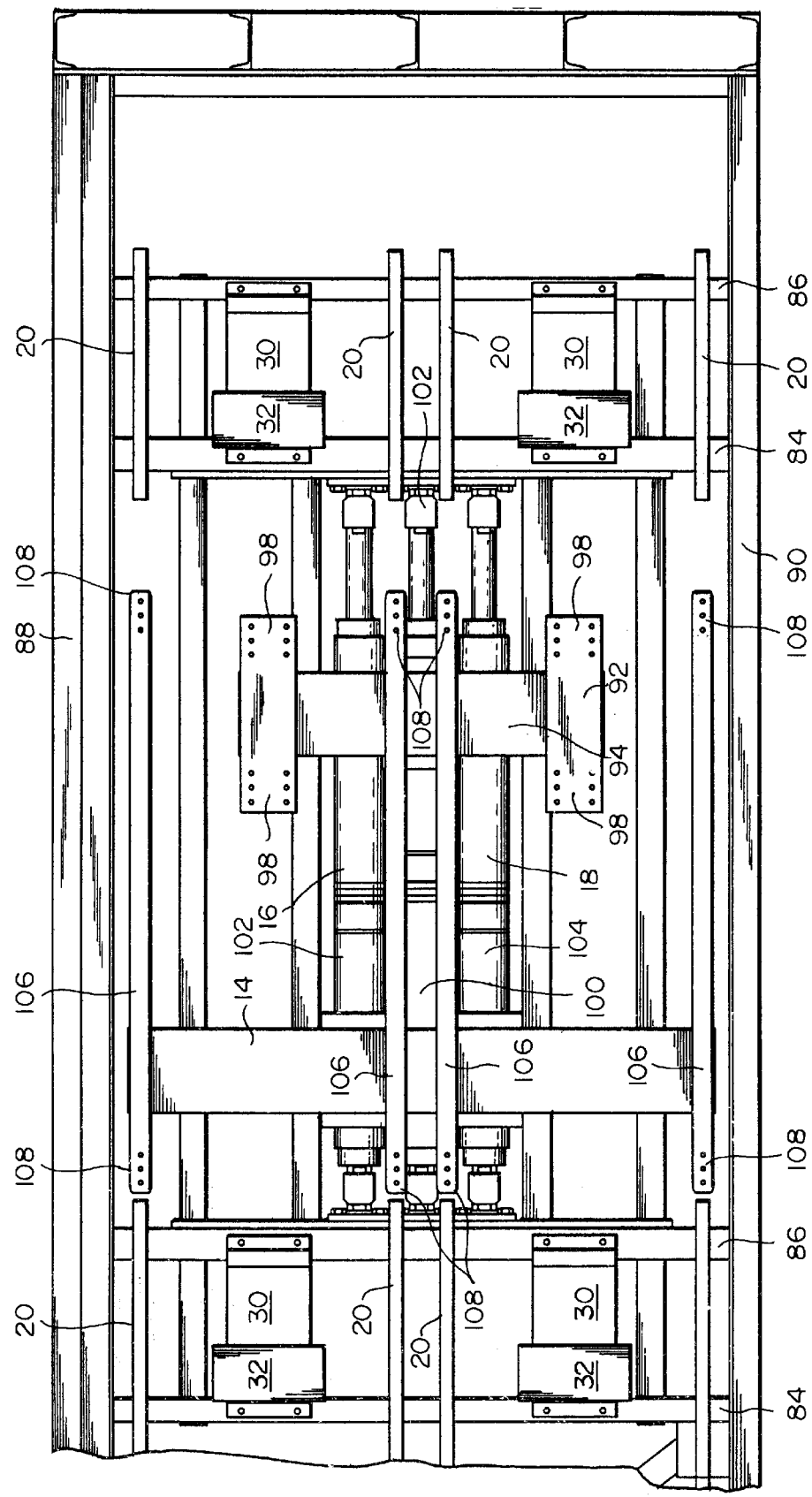
FIG. 25 is a view like FIG. 24, but showing the drive frames removed.
Figure 26:
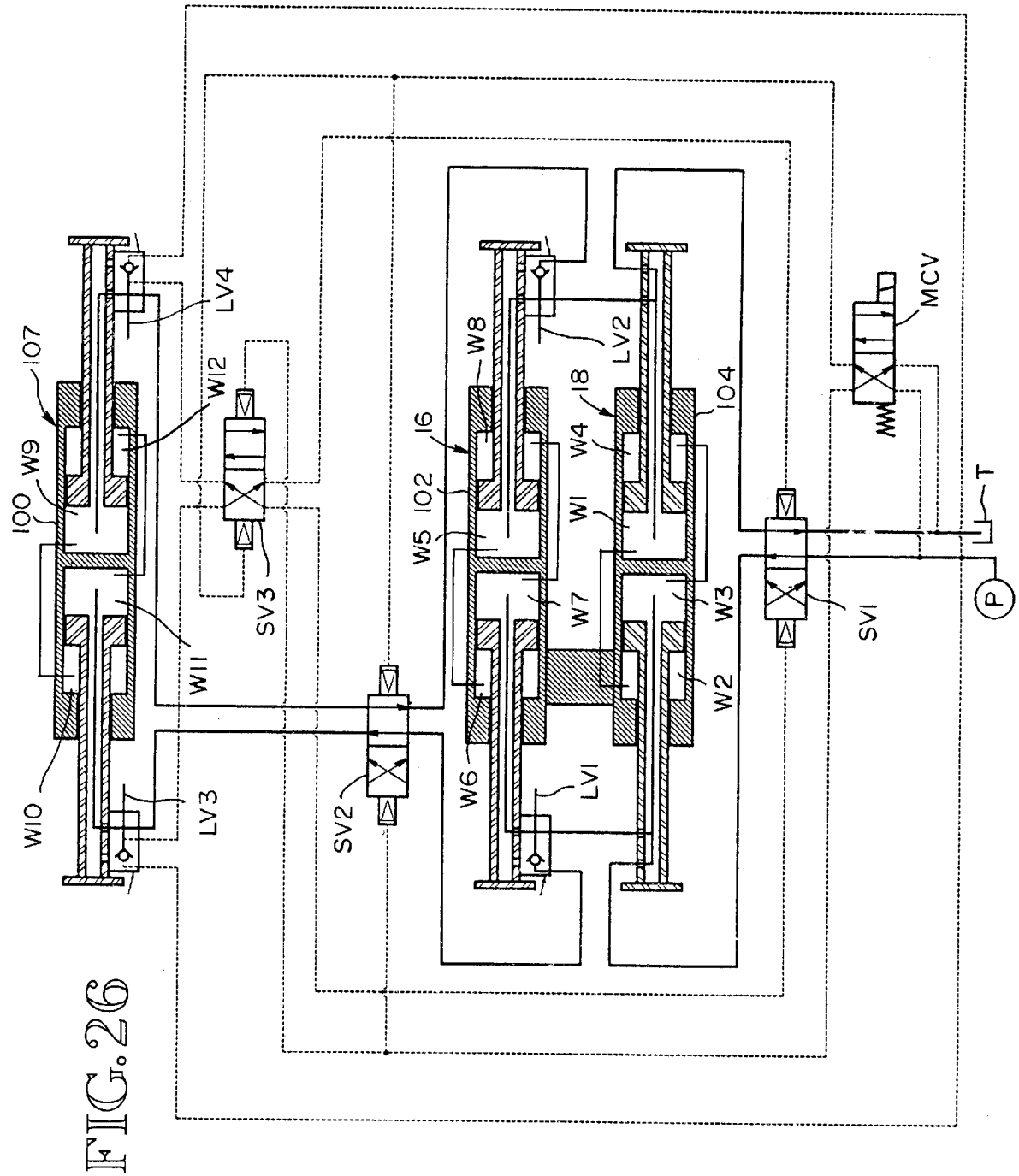
FIG. 26 is a schematic diagram of a hydraulic drive and control system for the conveying slats and the drive frames that raise and lower the lifting slats.
Figure 27:
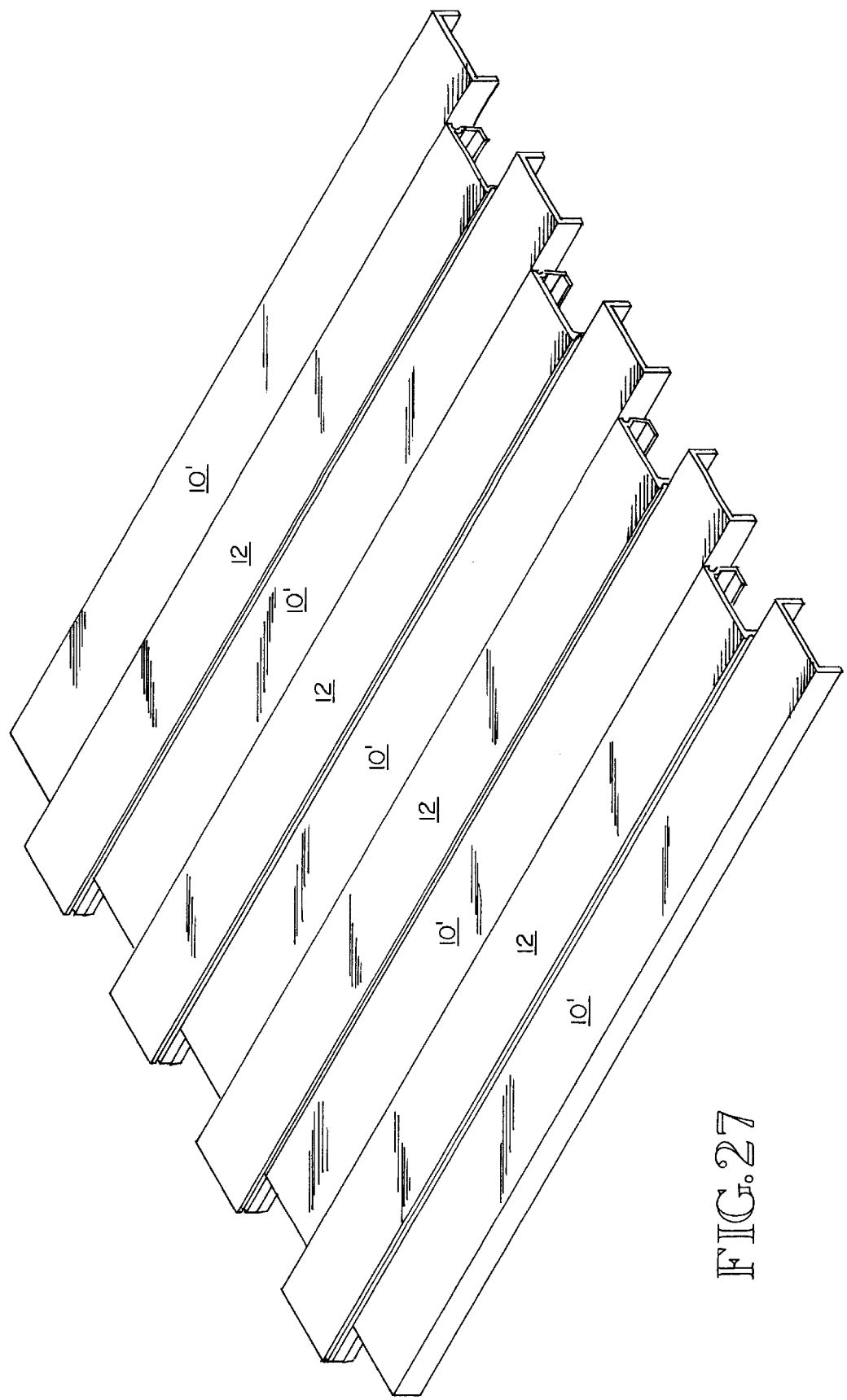
FIG. 27 is a view like FIG. 7 of a second embodiment in which all of the slats are substantially equal in width.
Figure 28:
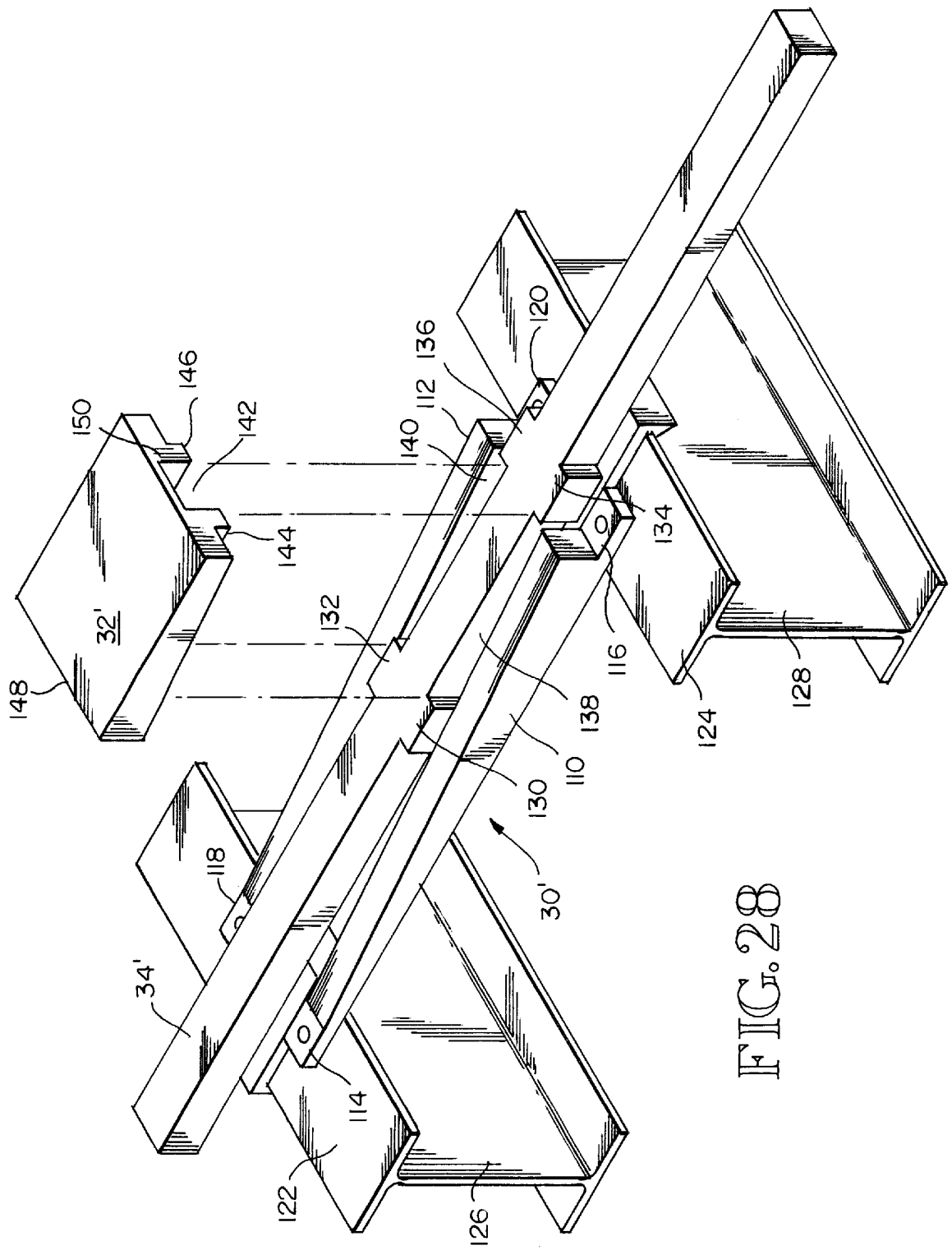
FIG. 28 is a view like FIG. 17 but of the second embodiment.

FIGS. 24 and 25 are plan views at one end of the conveyor. FIG. 24 shows the lifting and conveyor slats removed. FIG. 25 shows the conveying and lifting slats and the drive members 34 removed. When the drive members 34, are in place, the bearing strips 92, 94 that extend along the lower surfaces of the side members 38, 36 rest on the upper surfaces of the cross members 84, 86. The plates 56 are bolted to plates 92 (FIG. 25) that are at the opposite ends of a transverse drive member 94. Screw type fasteners are extended through fastener openings 96 in the plates 52 and 98 in the plates 92. At its center, transverse drive member 94 is connected to the movable center portion 100 of a drive unit 102. A bolt connection of the plates 56 to the plates 92 will provide a very secure connection of the drive members 34 to the transverse drive member 94. Thus, as the center portion 100 of the drive unit 104 reciprocates back and forth, front to rear of the conveyor, the transverse drive member 94 transmits this motion to the drive members 34 that control movement of the lifting blocks 32 up and down the lifting ramps 30. Transverse drive member 14 is attached to the movable center portions 102, 104 of the drive units 16, 18 (FIG. 25). As the movable center portions 102, 104 of the drive units 16, 18 reciprocate back and forth, they move the transverse drive beam 14 that is connected to the, conveying slats by means of connectors 106. Connectors 106 include groups 108 of openings which receive screw fasteners that are used for securing the conveying slats 12 to the connectors 106 and, hence, to the transverse drive beam 14 and the center portions 102, 104 of the drive units 16, 18.

Referring to FIG. 26, the three drive units 16, 18, 101 are substantially identical in construction. Drive unit 18 includes working chambers w1, w2 that are interconnected and working chambers w3, w4 that are interconnected. Drive unit 16 includes working chambers w5, w6 that are interconnected and working chambers w7, w8 that are interconnected. Drive unit 101 includes working chambers w9 and w10 that are interconnected and working chambers w11 and w12 that are interconnected. Drive unit 16 is provided with two limit valves LV1, LV2 and drive unit 101 is provided with two limit valves LV3, LV4. Drive units 16, 18 are connected together and so limit valves LV1, LV2 control drive unit 18 as well as drive unit 16.

The system comprises a pump P, a return or tank T, a main control valve MCV and three switching valves SV1, SV2, SV3. Preferably, the switching valves SV1, SV2, SV3 are fluid pressure controlled, by operation of the limit valves LV1, LV3, LV4.

The drive units 16, 18, 101 may be constructed in the manner disclosed in U.S. Pat. No. 4,748,893, granted Jun. 7, 1988 to Raymond K. Foster (incorporated herein by this reference).

Referring again to FIG. 26, when switching valve SV1 is in the position illustrated, pressure fluid from the pump P is delivered simultaneously into working chambers w3, w4 in drive unit 18 and w7, w8 in drive unit 16. Working chambers w1, w2 in drive unit 18 and w5, w6 in drive unit 16 are connected to return or tank T. As a result, the moving portions 102, 104 of the drive units 16, 18 move to the right, as pictured, and they move with them the transverse drive beam 14 and the conveying slats 12. Let it be assumed that this is the conveying direction. When the switching valves SV2, SV3 are, in the positions illustrated, pressure fluid is delivered into the working chambers w11, w12 and is released from the working chambers w9, w10. As a result, the movable portion 100 of drive unit 101, and the transverse drive beam 94 are moved to the right as illustrated in FIG. 25. This causes the drive member 34 to move to the right, in the conveying direction.

The main control valve MCV and the limit valves LV1, LV2, LV3, LV4 control the delivery of fluid pressure to and from the pilot chambers at the opposite ends of the switching valves SV1, SV2, SV3. As will be appreciated, main control valve MCV is positioned so that fluid pressure and return to drive unit 101 will operate the drive unit 101 to move the drive member 34 and raise the lifting blocks 32, and the lifting slats 10 resting on them, followed by operation of the drive units 16, 18 to retract the drive beam 14 and conveying slats 12. Then, drive unit 101 is reversed, so as to lower the lifting blocks 32 and the lifting slats 30, and this is followed by operation of the drive units 16, 18 to move the transverse drive beam 14 and the conveying slats 12 in a conveying direction.

The fluid pressure supply and control circuit shown by FIG. 26 is merely an example of a number of suitable fluid pressure supply control systems that may be used to control the lifting slats 10 and the conveying slats 12.

Figure 29:
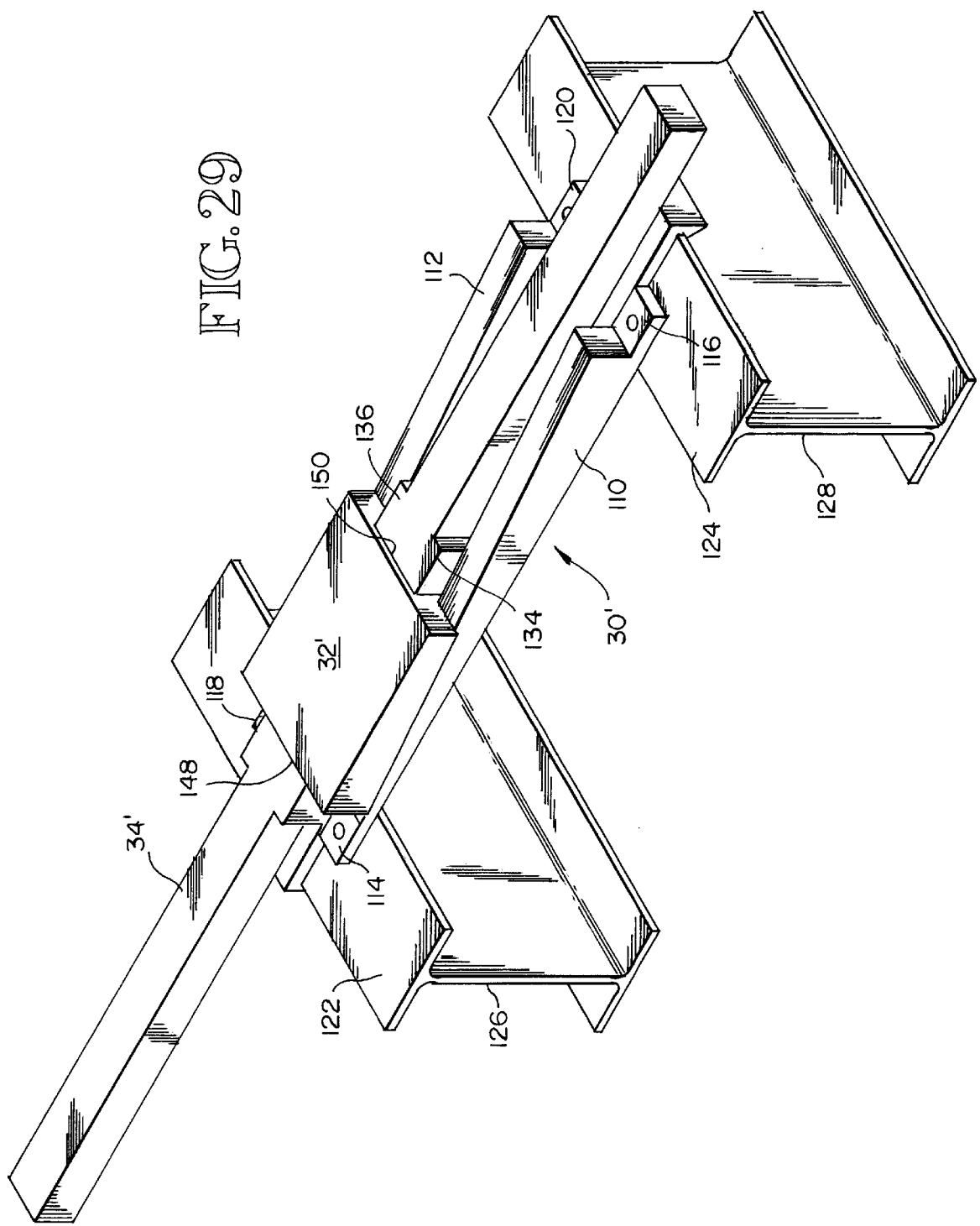
FIG. 29 is a view like FIG. 18, but of the second embodiment.
Figure 30:
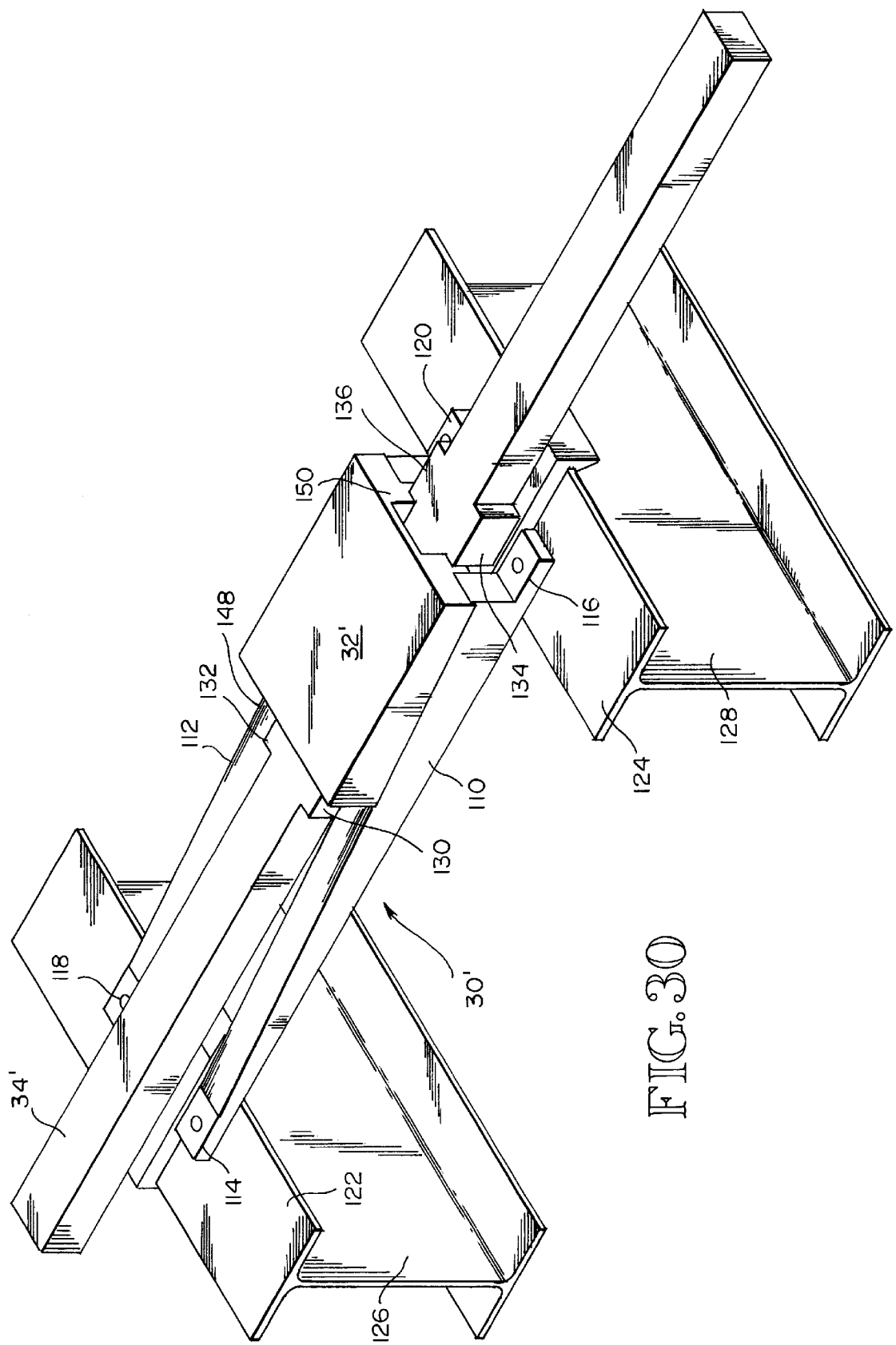
FIG. 30 is a view like FIG. 19, but of the second embodiment.
Figure 33:
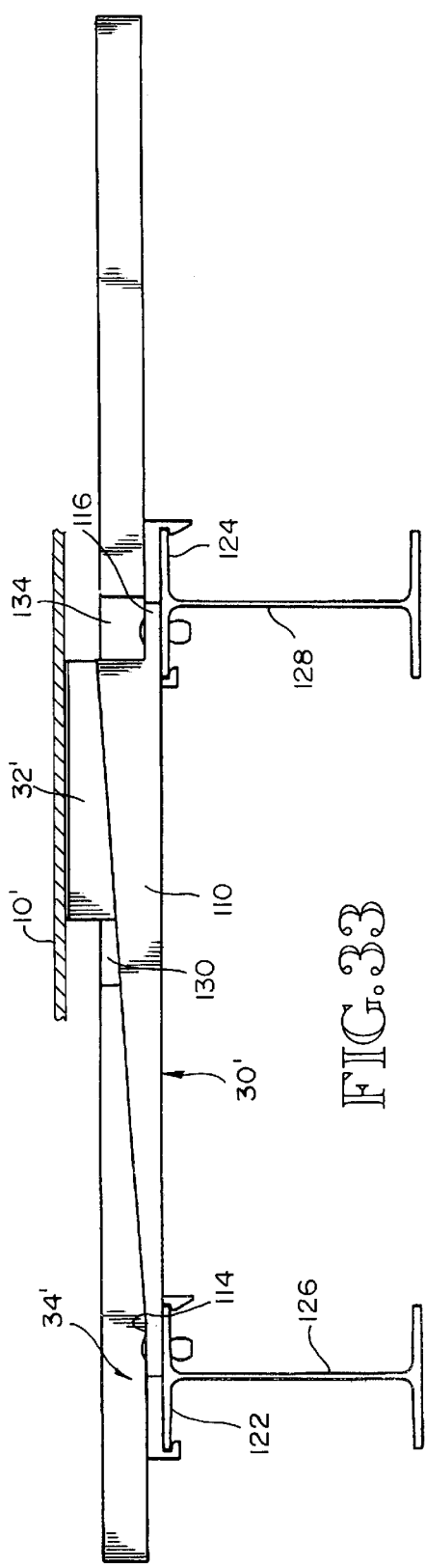
FIG. 33 is a view like FIG. 23, but of the second embodiment.
Figure 34:
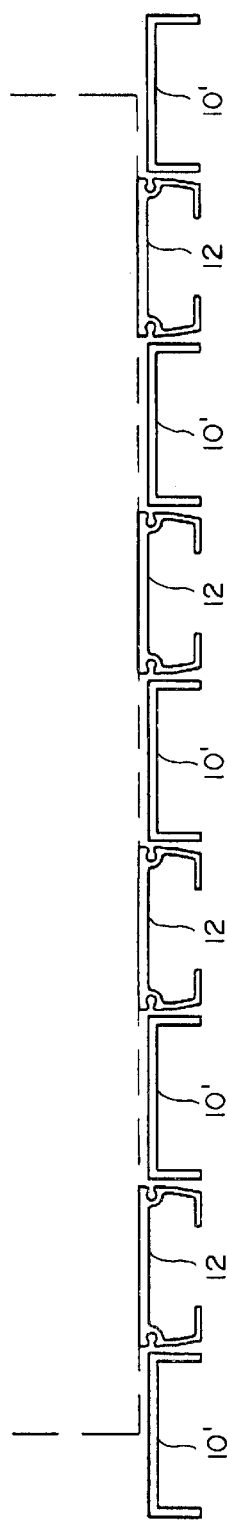
FIG. 34 is a view like FIG. 5, but of the second embodiment.
Figure 35:
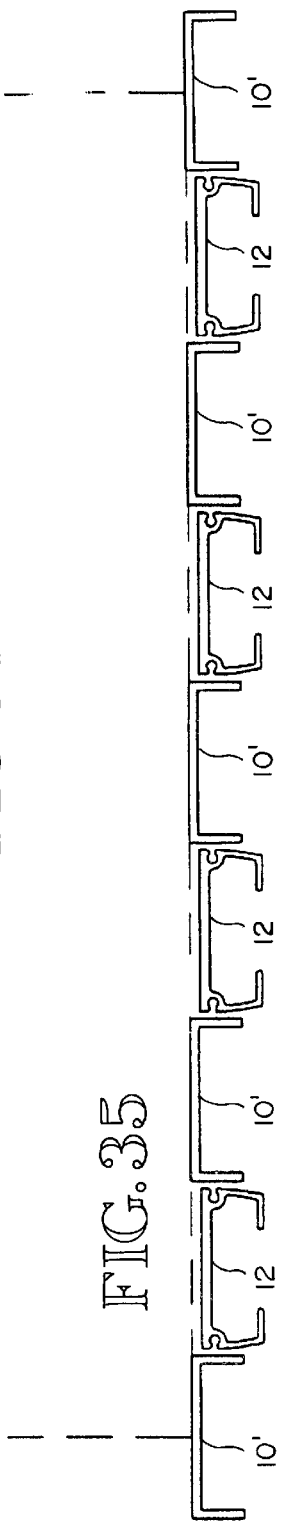
FIG. 35 is a view like FIG. 6, but of the second embodiment.

Referring now to FIGS. 27–35, the second embodiment may comprise alternative lifting slats 10' and intermediate conveying slats 12. In this embodiment, the lifting slats 10' may be substantially equal in width to the conveying slats 12. Referring to FIGS. 28–33, in this embodiment, the lifting blocks 32' are narrower than the lifting blocks 32 in the first embodiment. They are sized to fit up into the lifting slats 10'. The lifting ramp 30' has two laterally spaced apart side portions 110, 112. Each side portion 110, 112 has an upper surface that slopes from a low end to a high end. The opposite end portions 114, 116, 118, 120 of the ramp side parts 110, 112 are connected to the upper portions 122, 124 of a pair of adjacent transverse frame beams 126, 128. In this, embodiment, the drive member 34' may be a single member that is positioned between the side portions 110, 112 of the lifting ramp 30'. It may include a pair of laterally outwardly projecting rear abutments 130, 132 and a pair of laterally outwardly projecting forward abutments 134, 136. Abutment 134 is positioned longitudinally forwardly of abutment 130 on the same side of the drive member 34'. In similar fashion, abutment 136 is positioned longitudinally forwardly of the abutment 132, on the opposite side of the drive member 34'. A first space or pocket 138 is defined laterally by and between lifting ramp side portion 110 and the region of drive-member 34 that is between abutments 130, 134. A second space or pocket 140 is defined by and between lifting ramp side portion 112 and the opposite side of drive member 34' in the region between abutment 132 and abutment 136. The lifting block 32' includes a downwardly opening longitudinal channel 142 that fits down over the portion of drive member 34' that is longitudinally between the abutment pairs 130, 132 and 134, 136. It is flanked at its sides by downwardly extending sidewalls 144, 146 that fit down into the pockets 138, 140, respectively. FIG. 29 shows the drive member 34' retracted and the lifting block 32' at the low end of the lifting ramp 30'. When drive member 34' is moved to the right, as illustrated, the abutments 130, 132 push against the rear end 148 of the lifting block 32' and push it up the side parts 110, 112 of the lifting ramp 30'. FIG. 30 shows the lifting block 32 at the upper or high end of the lifting ramp 30'. As can be appreciated, movement of the drive member 34' in the opposite direction moves the abutments 134, 136 against the opposite end 150 of the lifting block 32'. This moves the lifting block 32' down the sloping upper surfaces of the side members 110, 112 of the lifting ramp 30'. This downward movement of the lifting block 32' allows the lifting slats 10' to gravitate to their "down" positions.

As in the first embodiment, the drive members 34' are connected to a transverse drive beam that in turn is connected to a transverse drive beam that is mounted on the movable portions 102, 104 of the drive units 16, 18. The conveying slats 12 are connected to connector members 106 that are in turn connected to the transverse drive beam 14 that is connected to the movable portion 110 of drive unit 101.

In another embodiment, two of the three drive units may be connected to the cross member 94 that is connected to the drive members 34 and the third drive unit can be connected to the cross member 14 that is connected to the conveying slats 12. Or, two drive units can be provided for each transverse drive beam 14, 94. That is, the total number of drive units and the number of drive units associated with each transverse drive beam 14, 94 is a variable.

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. A slat conveyor comprising at least one lifting slat having a down position, an up position and a top;
    a fixed position lifting ramp below the top of said lifting slat, said lifting ramp having an upper surface that slopes upwardly from a low end to a high end;
    a lifting block positioned on the lifting ramp, vertically between the lifting ramp and the top of the lifting slat, said lifting block having a sloping bottom surface corresponding in slope to the top surface of the lifting ramp, and having a top surface that is substantially parallel to the top of the lifting slat when the sloping bottom surface of the lifting block is on the sloping top surface of the lifting ramp; and
    a longitudinally reciprocating drive member having at least one abutment that is movable against the lifting block as the drive member moves in a first direction, for forcing the lifting block up the lifting ramp, so as to cause the lifting block to push upwardly on the lifting slat and move it upwardly into its up position, and also having at least one other abutment that when the drive member is reversed is movable against the lifting block for forcing the lifting block down the lifting ramp, allowing the lifting slat to drop downwardly into its down position.

2. The slat conveyor of claim 1, wherein the lifting block comprises a top portion that includes said sloping bottom surface and said top surface and which further includes a pair of sidewalls which depend downwardly from the bottom surface adjacent the opposite sides of the lifting ramp.

3. The slat conveyor of claim 1, wherein the drive frame has a pair of longitudinally extending side members that are positioned outwardly of both the lifting ramp and the lifting block, and each side member includes a pair of inwardly projecting abutments defining between them a space in which a side portion of the lifting block is received.

4. The slat conveyor of claim 3, wherein the lifting block has a pair of opposite side portions which depend from the sloping lower surface of the block into positions that are laterally outwardly from side boundaries of the lifting ramp, laterally inwardly from the longitudinal portions of the drive frame, and longitudinally between the two abutments that project laterally inwardly from the side members of the drive frame.

5. The slat conveyor of claim 1, wherein the lifting ramp is constructed from metal and the lifting block is constructed from a self-lubricated plastic material such that the lifting block acts as a bearing both where it contacts the lifting ramp and where it is contacted by the lifting slat.

6. The slat conveyor of claim 1, wherein the slat conveyor includes a base frame below the drive frame and the lifting ramp, and said lifting ramp is secured to said base frame, and a self-lubricated plastic bearing is positioned vertically, between the drive frame and the base frame for facilitating sliding movement of the drive frame relative to the base frame.

7. The slat conveyor of claim 1, wherein the drive frame comprises a pair of laterally spaced apart longitudinal members and longitudinally spaced apart lateral members interconnecting the longitudinal members.

8. A slat conveyor comprising at least one lifting slat having a down position, an up position and a top;
   a fixed position lifting ramp below the top of said lifting slat, said lifting ramp including two laterally spaced apart side parts, each having an upper surface that slopes upwardly from a low end to a high end;
   a lifting block positioned on the lifting ramp side parts, vertically between the lifting ramp side parts and the top of the lifting slat, said lifting block having a sloping bottom surface on each side corresponding in slope to the upper surfaces of the lifting ramp side parts, and having a top surface that is substantially parallel to the top of the lifting slat when the sloping bottom surfaces of the lifting block are on the sloping top surface of the lifting ramp side parts; and
   a longitudinally reciprocating drive member having at least one abutment that is movable against the lifting block as the drive member moves in a first direction, for pushing the lifting block up the lifting ramp, so as to cause the lifting block to push upwardly on the lifting slat and move it upwardly into its up position, and also having at least one other abutment that when the drive member is reversed is movable against the lifting block for forcing the lifting block down the lifting ramp, allowing the lifting slat to drop downwardly into its down position.

9. The slat conveyor of claim 8, wherein the lifting block comprises a top portion that includes said sloping bottom, surfaces and said top surface and which further includes a pair of vertical walls that depend downwardly from the top portion on opposite sides of said drive member and inwardly adjacent the side parts of the lifting ramp.

10. The slat conveyor of claim 8, wherein the drive member is a longitudinal member that is positioned between the side parts of the lifting ramp, and said drive member includes a pair of outwardly projecting abutments on said member forwardly of the lifting block and another pair of outwardly projecting abutments on said member behind the lifting block, said abutments moving in a space that is laterally between the side parts of the lifting ramp.

11. The slat conveyor of claim 8, wherein the lifting ramp is constructed from metal and the lifting block is constructed from a self-lubricated plastic material such that the lifting block acts as a bearing.

12. A slat conveyor, comprising:
   a set of conveying slats;
   a set of lifting slats;
   each lifting slat being adjacent at least one conveying slat;
   said conveying and lifting slats being parallel to each other;
   said lifting slats having a down position, an up position and substantially co-planar tops;
   said conveying slats having a start position, an advanced position and substantially co-planar tops;
   a reversible drive connected to the conveying slats for selectively moving them endwise together, from the start position to the advanced position and back;
   said tops of said lifting slats being below the tops of the conveying slats when the lifting slats are in the down position;
   said tops of said lifting slats being above the tops of thee conveying slats when the lifting slats are in their up position; and
   a lifting cam mechanism for lifting and lowering the lifting slats, characterized by:
      a plurality of fixed position lifting ramps spaced apart longitudinally of each lifting slat, below the top of the lifting slat;
      said lifting ramps having upper surfaces that slope upwardly in the same direction, from a low end to a high end;
      a plurality of lifting blocks, one for each lifting ramp, positionable on the ramps, each said lifting block having a trailing end, a leading end, a sloping bottom surface corresponding in slope to the top surface of its lifting ramp, and a top surface that is below and substantially parallel to the top of the lifting slat when the sloping bottom surface of the lifting block is positioned on the sloping top surface of its lifting ramp;
      a push/pull drive for each lifting slat, positioned below its lifting slat, each said push/pull unit including at least one push member for each lifting block, positioned rearwardly of the trailing end of the lifting block, and at least one pull member for each lifting block, positioned forwardly of the leading end of the lifting block; and
      whereby a push on the push/pull units will move the push members against the trailing ends of the lifting blocks and push the lifting blocks up the lifting ramps into contact with the top of its lifting slat, to move the lifting slat upwardly into its up position, and a pull on the push/pull unit will pull the pull members against the leading ends of the lifting blocks, moving the lifting blocks downwardly along the lifting ramps, allowing the lifting slats to drop down into their down position.

13. The slat conveyor of claim 12, wherein each lifting block comprises a top portion that includes said sloping bottom surface and said top surface and which further includes, a pair of sidewalls which depend downwardly from the bottom surface adjacent the opposite sides of its lifting ramp.

14. The slat conveyor of claim 12, wherein each drive frame has a pair of longitudinally extending side members that are positioned outwardly of both the lifting ramps and the lifting blocks, and each side member includes a pair of inwardly projecting abutments the finding between them a space in which a side portion of a lifting block is received.

15. The slat conveyor of claim 12, wherein each lifting block has a pair of opposite side portions which depend from the sloping lower surface of the block into positions that are laterally outwardly from side boundaries of a related lifting ramp, laterally inwardly from the longitudinal portions of the drive frame, and longitudinally between two abutments that project laterally inwardly from the side members of the drive frame.

16. The slat conveyor of claim 12, wherein each lifting ramp is constructed from metal and the lifting block is, constructed from a self-lubricated plastic material such that the lifting block acts as a bearing.

17. The slat conveyor of claim 12, wherein the slat conveyor includes a base frame below each drive frame and the lifting ramp, and said lifting ramp is secured to said base frame, and a self-lubricated plastic bearing is positioned vertically between each drive frame and the base frame for facilitating movement of the drive frame.

18. The slat conveyor of claim 12, wherein each drive frame comprises a pair of laterally spaced apart longitudinal members and longitudinally spaced apart lateral members interconnecting the longitudinal members.

19. A slat conveyor, comprising:

a set of conveying slats;

a set of lifting slats;

each lifting slat being adjacent at least one conveying slat;

said conveying and lifting slats being parallel to each other;

said lifting slats having a down position, an up position and substantially co-planar tops;

said conveying slats having a start position, an advanced position and substantially co-planar tops;

a reversible drive connected to the conveying slats for selectively moving them endwise together, from the start position to the advanced position and back;

said tops of said lifting slats being below the tops of the conveying slats when the lifting slats are in the down position;

said tops of said lifting slats being above the tops of the conveying slats when the lifting slats are in their up position; and a lifting cam mechanism for lifting and lowering the lifting slats, characterized by:

a plurality of fixed position lifting ramps spaced apart longitudinally of each lifting slat, below the top of the lifting slat;

said lifting ramps each having two laterally spaced apart side parts, each having an upper surface that slopes upwardly in the same direction, from a low end to a high end;

a plurality of lifting blocks, one for each lifting ramp, positionable on the ramps, each said lifting block having a trailing end, a leading end, a sloping bottom surface corresponding in slope to the top surfaces of the side parts of its lifting ramp, and a top surface that is below and substantially parallel to the top of the lifting slat when the sloping bottom surfaces of the lifting block are positioned on the sloping top surfaces of the side parts of its lifting ramp;

a push/pull drive member for each lifting slat, positioned below its lifting slat, each said push/pull drive member including at least one push member for each lifting block, positioned rearwardly of the trailing end of the lifting block, and at least one pull member for each lifting block, positioned forwardly of the leading end of the lifting block; and whereby a push on the push/pull drive member will move the push members against the trailing ends of the lifting blocks and push the lifting blocks up the lifting ramps into contact with the top of its lifting slat, to move the lifting slat upwardly into its up position, and a pull on the push/pull drive member will pull the pull members against the leading ends of the lifting blocks, moving the lifting blocks downwardly along the lifting ramps, allowing the lifting slats to drop down into their down position.

20. The slat conveyor of claim 19, wherein each lifting block comprises a top portion that includes said sloping bottom surfaces and said top surface, and wherein each lifting block further includes a pair of sidewalls that depend downwardly from the block into positions laterally outwardly of the push/pull drive member and laterally inwardly of the side portions of the lifting ramps.

21. The slat conveyor of claim 19, wherein each push/pull drive member has a portion adjacent each lifting ramp that is positioned between the side portions of the lifting ramp, and each such portion of the push/pull drive member has a first pair of laterally outwardly projecting abutments on it and a second pair of laterally outwardly projecting abutments on it that are spaced longitudinally from the first pair of laterally outwardly projecting abutments, and wherein each lifting block includes a pair of downwardly projecting portions that laterally fit between the push/pull drive member and the side portions of the lifting ramps and longitudinally between the abutments on the push/pull drive member that are on its side of the push/pull drive member.

22. The slat conveyor of claim 19, wherein each lifting ramp is constructed from metal and each lifting block is constructed from a self-lubricated plastic material such that the lifting block acts as a bearing with respect to both its lifting ramp and its lifting slat.

23. The slat conveyor of claim 19, wherein the slat conveyor includes a base frame below the push/pull drive members and the lifting ramps, and the lifting ramps are secured to said base frame, and a self-lubricated plastic bearing is positioned vertically between each push/pull drive member and the base frame, for facilitating movement of the push/pull drive member.

\* \* \* \* \*